US012595008B2

(12) United States Patent
Gibson et al.

(10) Patent No.: US 12,595,008 B2
(45) Date of Patent: Apr. 7, 2026

(54) CONVERTIBLE, ALL-TERRAIN GEAR CART AND TOWING SYSTEM FOR SUCH A GEAR CART

(71) Applicants: Bryce Gibson, Dedham, MA (US); Kurt MacLaurin, Lincoln, MA (US)

(72) Inventors: Bryce Gibson, Dedham, MA (US); Kurt MacLaurin, Lincoln, MA (US)

( * ) Notice: Subject to any disclaimer, the term of this patent is extended or adjusted under 35 U.S.C. 154(b) by 419 days.

(21) Appl. No.: 18/197,939

(22) Filed: May 16, 2023

(65) Prior Publication Data

US 2023/0286604 A1    Sep. 14, 2023

Related U.S. Application Data

(63) Continuation-in-part of application No. 17/198,678, filed on Mar. 11, 2021, now Pat. No. 11,648,970.

(51) Int. Cl.
B62D 63/06 (2006.01)

(52) U.S. Cl.
CPC ................................. B62D 63/064 (2013.01)

(58) Field of Classification Search
CPC ........ B62D 36/064; B60D 1/00; B60D 1/143; B60D 1/485; B60D 1/488; B60D 1/52; B60D 2001/003
See application file for complete search history.

(56) References Cited

U.S. PATENT DOCUMENTS 3,848,890 A * 11/1974 MacAlpine ............ B62K 27/12
                                                                280/204
4,174,120 A * 11/1979 Freeman ................ B62K 27/12
                                                                280/204

4,593,840 A      6/1986   Chown
4,938,399 A      7/1990   Hull et al.
5,029,740 A      7/1991   Cox
5,732,866 A      3/1998   Janek
5,826,768 A     10/1998   Gamulo
5,853,189 A     12/1998   Swartzlander
6,039,227 A      3/2000   Stark
                (Continued)

FOREIGN PATENT DOCUMENTS

AT              521332 A1    12/2019
EP             0068436 A2     1/1983
WO      WO2019006557 A1       1/2019

*Primary Examiner* — James A Shriver, II

(74) *Attorney, Agent, or Firm* — Thomas P. O'Connell; O'Connell Law Firm

(57)          ABSTRACT

An all-terrain gear cart convertible between manual propulsion and trailering and a towing system for establishing a towing relationship between the cart and a towing vehicle. The towing system has a reverse hook structure with first and second towing hooks and a latch member for selectively retaining an engaging portion of a tow and control handle within the towing hooks. A retaining formation of the latch member can be selectively retained by a receiving latch. The reverse hook structure can be formed with a rack affixed to the towing vehicle, or first and second anterior attachment hooks can selectively hook the reverse hook structure to a preexisting rack of the towing vehicle. The gear cart can have a pivotable tailgate and a selectively extendable cargo bed extension structure. The left, right, and anterior frame sections of the cart can be independently pivotable to facilitate achievement of a flatbed configuration.

12 Claims, 29 Drawing Sheets

(56) References Cited

U.S. PATENT DOCUMENTS

| | | | |
|---|---|---|---|
| 6,705,821 B2 | 3/2004 | Philipps et al. | |
| 6,746,037 B1 | 6/2004 | Kaplenski et al. | |
| 6,802,441 B1 | 10/2004 | DuRant et al. | |
| 6,846,017 B2 | 1/2005 | Martin | |
| 6,935,656 B2 | 8/2005 | Stout | |
| 6,948,732 B2 | 9/2005 | Amacker | |
| 7,172,207 B2 | 2/2007 | Henry | |
| 7,210,697 B2 * | 5/2007 | Simpson | B62B 5/06 |
| | | | 16/446 |
| 7,341,417 B1 | 3/2008 | Lohr | |
| 7,641,235 B1 | 1/2010 | Anduss | |
| 7,823,906 B2 | 11/2010 | Darling, III | |
| 8,419,035 B2 | 4/2013 | Wilson et al. | |
| 8,505,932 B1 | 8/2013 | Piccirillo | |
| 8,505,959 B2 | 8/2013 | Darling, III | |
| 8,985,418 B1 | 3/2015 | Poudrier | |
| 9,156,319 B1 * | 10/2015 | Kennemer | B60D 1/145 |
| 9,789,804 B2 | 10/2017 | Brinkley et al. | |
| 10,053,128 B2 | 8/2018 | Rackleff et al. | |
| 10,071,757 B1 | 9/2018 | Cheatham et al. | |
| 10,131,371 B2 | 11/2018 | Camarco et al. | |
| 10,562,463 B1 | 2/2020 | Speer et al. | |
| 12,036,911 B2 * | 7/2024 | Pang | B62B 3/007 |
| 2001/0014272 A1 | 8/2001 | Ochoa et al. | |
| 2002/0063142 A1 | 5/2002 | Williams et al. | |
| 2004/0173654 A1 | 9/2004 | McAlister | |
| 2004/0244143 A1 * | 12/2004 | Browder | B60D 1/565 |
| | | | 16/110.1 |
| 2006/0145461 A1 | 7/2006 | Anderson | |
| 2006/0151555 A1 | 7/2006 | Mills | |
| 2007/0126192 A1 | 6/2007 | Thomas | |
| 2008/0111348 A1 | 5/2008 | Lawson | |
| 2008/0150245 A1 | 6/2008 | Clatt | |
| 2008/0150253 A1 | 6/2008 | Crawford et al. | |
| 2008/0247855 A1 | 10/2008 | Lee et al. | |
| 2008/0296330 A1 | 12/2008 | Kalous et al. | |
| 2009/0038558 A1 | 2/2009 | Schulte | |
| 2009/0152314 A1 | 6/2009 | Myrex | |
| 2009/0230642 A1 | 9/2009 | Thomas | |
| 2009/0232633 A1 | 9/2009 | Stamps et al. | |
| 2010/0066069 A1 | 3/2010 | Bradshaw | |
| 2010/0155443 A1 | 6/2010 | Lasater | |
| 2010/0260587 A1 | 10/2010 | LeAnna | |
| 2010/0320739 A1 | 12/2010 | Kittrell | |
| 2015/0122859 A1 | 5/2015 | Brinkley et al. | |
| 2016/0368516 A1 | 12/2016 | Devers | |
| 2022/0306179 A1 * | 9/2022 | Wernberg | B62B 1/24 |

* cited by examiner

CONVERTIBLE, ALL-TERRAIN GEAR CART AND TOWING SYSTEM FOR SUCH A GEAR CART

CROSS-REFERENCE TO RELATED APPLICATION

The present application is a Continuation-in-Part of U.S. patent application Ser. No. 17/198,678, filed Mar. 11, 2021, which is incorporated herein by reference in its entirety.

FIELD OF THE INVENTION

The present invention relates generally to wheeled vehicles. More particularly, disclosed herein is a convertible, all-terrain gear cart that can be readily converted between modes of manual propulsion, trailering, and support by a motor vehicle and that can be stably and reliably levered into and out of supported engagement with a trailer hitch of a motor vehicle exploiting mechanical advantages provided by handle and wheel geometry and hitch adapter construction.

BACKGROUND OF THE INVENTION

There are many circumstances where it is desirable to store and transport cargo. A person traveling on foot might seek to haul skis, skates, or other sports gear to the base of a mountain or to a skating rink or to an athletic field, or one may wish to transport fishing or beach supplies over hard and soft surfaces to a final destination at a beach. In other circumstances, such as the rock climber traveling to a rock face or the mountain biker trekking to a remote camping location, a person may wish to pull heavy equipment and supplies behind a bicycle. That same person may have a need to transport goods and a transport vehicle for such goods to and from a given location, such as the departure point for a hike or a mountain biking trek or the general location of a beach or athletic field. With an understanding of the foregoing, the present inventors have appreciated that there is a real need for a multi-functional cart that can traverse substantially any terrain and that can be readily converted between modes of manual propulsion, trailering behind a bicycle, and support and transportation by a motor vehicle.

The prior art has disclosed convertible cargo carriers. For instance, with U.S. Pat. No. 8,985,418, Poudrier taught a Convertible Cargo Carrier Cart System that can be towed behind a bicycle, pulled by a person on foot, or engaged with a trailer hitch of a vehicle for transport. While advantageous for its adaptability, the convertible cart in Poudrier exhibits a number of limitations common to many such convertible carts. Although the cart system can be pulled by a bicycle or supported by a vehicle trailer hitch, the cart system appears to rely on the sheer strength of the user to lift the entire cart and any articles supported thereby from a ground surface and into engagement with the vehicle trailer hitch. Moreover, apart from guide members that can be selectively engaged with the cart, little or no provision is made for retaining and transporting articles. Still further, the system appears to require the attachment of supplementary components for conversion between modes while relying on a bicycle towing configuration whose structure and operation are at best marginally disclosed.

A further convertible transport system, entitled Curved Load Support for Use on a Vehicle, is taught by U.S. Pat. No. 9,789,804 to Brinkley et al. There, a wheeled cart can be manually propelled by use of a handle, or it can be engaged to be carried by a vehicle by a user's engaging a channel member of the cart with a support bar that extends from a vehicle hitch receiver and then pivoting and sliding the channel member and cart into position supported by the support bar and, therefore, by the vehicle. Brinkley thus proposes a solution to the need to lift the entire weight of a cart into position to be supported by a vehicle. However, the convertibility of the cart is limited between a simple hand cart and a hitch-mounted carrier. No structure or function is apparently provided to permit towing by a bicycle. Furthermore, the cart is essentially limited to use as a hand truck with no accommodation provided in the manual propulsion mode to enable the retention of articles in an elevated, stabilized manner. Still further, engagement of the wheeled cart with a trailer hitch of a vehicle requires adroitly engaging the channel member with the support bar, which can be challenging with a substantial risk of inadvertent disengagement.

A similar, and similarly limited, structure for supporting bicycles is disclosed by U.S. Pat. No. 10,562,463 to Speer et al. for a Vehicle Load Carrier with Integrated Handling Wheels. There, the user is expected to pivot and align a square-ended hitch bar with a conventional trailer hitch receiver of a motor vehicle. While the proposed system attempts to provide advantage by not requiring a user to lift the entire weight of the rack or carrier by pivoting the rack or carrier into place, there is a real risk of the hitch bar becoming inadvertently disengaged from the trailer hitch during pivoting by the need to keep the square-ended hitch bar in engagement with the square-ended trailer hitch receiver. There is perhaps an even greater risk of inadvertent, premature disengagement of the hitch bar from the trailer hitch receiver during removal of the rack or carrier where the distal end of the hitch bar may not be perceived by the user. Apart from the frustration such disengagement would engender, there would also be risk of injury to the user and damage to the vehicle or any supported bicycles.

Further attachable cart structures are known, including the Attachable Cart System and Method of U.S. Pat. No. 10,131, 371 to Camarco et al. and the Vehicle Hitch Attachable Transporting Dolly of U.S. Pat. No. 7,641,235 to Anduss. These carts, although convertible from hand propulsion to vehicle-supported configurations, require complex raising and lowering mechanisms, and they do not contemplate enabling towing of the carts by a bicycle.

Thus, when the present inventors filed patent application Ser. No. 17/198,678, it was apparent that, despite the attempts of previous inventors to provide multi-functional, convertible transportation devices, there remained a need in the art for an all-terrain convertible gear cart that was efficient and elegant in structure and operation to enable ready conversion between modes of manual propulsion, bicycle trailering, and motor vehicle support and transportation, and the inventors devised of and protected just such a gear cart.

Even with—or perhaps due to—the teachings of the '678 application, the inventors recognized a number of further opportunities for development. One such area is in relation to the coupling between the gear cart and a towing vehicle, such as a bicycle. It has become apparent that it would be advantageous to devise of a coupling mechanism that requires no additional components to permit a gear cart to convert from a hand-operated cart to a towed vehicle and that provides a durable yet flexible interconnection between the cart and the towing vehicle. It also became apparent that, while a gear cart with a cargo bin of fixed dimensions is useful, it would be highly advantageous to provide a gear cart that is capable of being manually propelled and that provides an extendable, expandable cargo support surface. Further still, it has become apparent that a gear cart with a cargo bin that is convertible from an expanded configuration to a collapsed configuration while maintaining support and hauling functionality in a flat bed mode would be advantageous.

SUMMARY OF THE INVENTION

In view of the needs left by the prior art, the invention of the '678 application was founded on the basic object of providing a multi-functional gear cart that could be converted between modes of manual propulsion, trailering, and support by a motor vehicle. A further object was to provide a convertible gear cart that could be stably and reliably pivoted into and out of supported engagement with a trailer hitch of a vehicle with minimized risk of inadvertent disengagement. Another particular object of embodiments of the invention was to provide a convertible gear cart that could be adapted for traversing varied terrain when propelled manually and when towed by a bicycle or other vehicle. Further objects of embodiments of the invention were to provide a convertible gear cart that was efficient and elegant in structure and operation within individual modes of function and during intermodal conversion, that could stably support and transport varied cargo, and that could retain and support articles in an elevated, stabilized manner, including when in a manual propulsion mode. It was yet another object and achievement to provide a convertible gear cart that can protect and retain supported articles within a protective cage structure.

In view of the needs that became apparent with the development of the invention of the '678 application, the invention disclosed herein has an object of providing a coupling mechanism that requires no additional components to permit a gear cart to convert from a hand-operated cart to a towed vehicle while nonetheless providing a durable and flexible interconnection between the cart and the towing vehicle. A further object of embodiments of the invention is to provide a gear cart that is capable of being manually propelled that provides an extendable and expandable cargo support surface. In particular embodiments of the gear cart disclosed herein, a further object is to provide a gear cart with a cargo bin that is convertible from an expanded configuration to a collapsed configuration that nonetheless maintains support and hauling functionality in a flat bed transportation mode.

These and further objects, advantages, and details of the present invention will become obvious not only to one who reviews the present specification and drawings but also to those who have an opportunity to make use of an embodiment of the convertible, all-terrain gear cart disclosed herein. Although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more objects of the invention, one embodiment of the convertible, all-terrain gear cart is founded on a cargo bin with a first end, a second end, a first side, and a second side. A control arm has a proximal segment coupled to the cargo bin and a distal segment that retains a trailer hitch connector to enable the gear cart to be trailered by a trailering vehicle. A vehicle engaging member, which could for instance comprise a receiver or a retaining post, is retained by the cargo bin. Where the cargo bin is considered to have a longitudinal centerline that communicates from the first end to the second end of the cargo bin, the proximal segment of the control arm and the vehicle engaging member can be disposed in alignment with the longitudinal centerline. The vehicle engaging member has a distal end adjacent to the second end of the cargo bin adapted for being retained and supported by a trailer hitch receiver of a vehicle whether directly or through mutual engagement with a trailer hitch adapter. Still further, first and second wheels, which can be detachable, are rotatably retained at a mid-portion of the cargo bin with aligned, lateral axes of rotation.

Under the foregoing construction, the gear cart can be readily propelled manually, such as by a gripping of the distal segment of the control arm. Alternatively, by connection of the trailer hitch connector of the control arm to a corresponding trailer hitch connector retained by a trailering vehicle, the all-terrain gear cart can be readily towed by a bicycle or other trailering vehicle. Still further, by engagement of the vehicle engaging member with a trailer hitch receiver of a motor vehicle, whether directly or through mutual engagement with a trailer hitch adapter, the all-terrain gear cart can be stably supported and transported by the motor vehicle.

Embodiments of the convertible, all-terrain gear cart can further include first and second cargo retention and roll bars, and the cargo bin can be adapted to retain the first and second cargo retention and roll bars to project from the cargo bin. For instance, the first and second cargo retention and roll bars can be generally U-shaped with a central segment and first and second legs that project from the central segment. Each of the first and second legs of each cargo retention and roll bar can terminate in a tip segment, and tip receivers can then be disposed on the cargo bin in correspondence with the tip segments of the first and second legs of the cargo retention and roll bars. In certain practices of the invention, the cargo bin can be constructed as a cargo cage formed by a plurality of frame portions of rigid members, and the tip receivers disposed on the cargo bin in correspondence with the tip segments of the first and second legs of the cargo retention and roll bars can comprise tip segments of frame portions of the rigid members that form the cargo cage.

Still further, as disclosed herein, plural retaining members can be spaced along each roll bar, and a plurality of retaining straps can be provided that are adapted to engage the retaining members spaced along the roll bars. With that, widely varied cargo can be retained and protected by the combined functionalities of the cargo bin, the roll bars, and the retaining straps. Where the cargo bin comprises a cargo cage formed by a plurality of frame portions of rigid members to define an inner volume, the gear cart can further include a cargo liner shaped and sized in correspondence to the inner volume defined by the cargo cage. Moreover, plural pockets or sleeves can be spaced along the interior wall surface of the cargo liner to permit the further retention and stabilization of cargo, including elongate articles such as skis, hockey sticks, umbrellas, or any other elongate article.

In embodiments of the gear cart as disclosed herein, a retractable support leg can be retained by the cargo bin. The support leg has a retracted position adjacent to the cargo bin and an extended position wherein the support leg extends from the cargo bin. The support leg can be retractable in any effective manner, including by pivoting, by longitudinal sliding, or any other method.

The control arm is pivotally coupled to the cargo bin to be pivotable between a use position wherein the control arm extends from the cargo bin and a storage position wherein the control arm overlies the cargo bin. In particular embodiments of the gear cart, the distal segment of the control arm is disposed at an approximately 90-degree angle relative to the proximal segment of the control arm. With that, where the gear cart is presumed to be in an upright orientation, the control arm can pivot about a vertical pivot axis while the distal segment is disposed generally horizontally for manual propulsion or for trailering connection to a trailering vehicle. The distal segment of the control arm can be adjustable in height relative to the cargo bin, such as but not limited to by the proximal segment of the control arm being adjustably received in a control arm receiving tube or by the control arm itself being extendable, such as along a central segment thereof.

According to embodiments of the invention, the vehicle engaging member can take the form of a receiver, and a trailer hitch adapter can be provided for being retained by the trailer hitch receiver of the vehicle. The trailer hitch adapter can have a rigid tongue, and the vehicle engaging member can have an opening adapted to receive the rigid tongue of the trailer hitch adapter.

In further refined embodiments of the gear cart, the vehicle engaging member has a shelf portion that extends distally beyond the opening adapted to receive the rigid tongue of the trailer hitch adapter. With that, the shelf portion of the vehicle engaging member can be rested atop the rigid tongue of the trailer hitch adapter to permit the cargo bin to be pivoted using the rigid tongue as a fulcrum. By way of example and not limitation, the vehicle engaging member can comprise a rigid sleeve of rectangular cross section, and the distal end of the vehicle engaging member can be mitered to have a recessed lower portion and an overhanging upper portion that projects distally beyond the recessed lower portion to form the shelf portion. Further stability during pivoting can be provided where the opening of the vehicle engaging member and the rigid tongue have width dimensions greater than height dimensions. Broad, flat surfaces of the rigid tongue and the shelf portion can thus further prevent inadvertent tilting or disengagement of the gear cart relative to the motor vehicle.

Still further, the trailer hitch adapter can have a bar portion for being received into a trailer hitch receiver of a vehicle. The trailer hitch adapter has a longitudinal centerline, and the rigid tongue can fixedly project from the bar portion in parallel to but offset from the longitudinal centerline by a distance D. Under such constructions, a relative height of the rigid tongue can be adjusted by a distance of twice the distance D by orienting the rigid tongue above or below the bar portion of the trailer hitch adapter.

In other practices of the invention, the vehicle engaging member can take the form of a retaining post, potentially formed with a first sleeve extendably and retractably engaged with a second sleeve. The retaining post has a body portion and a distal end with a shelf portion that extends distally beyond the body portion. With that, the shelf portion of the vehicle engaging member can be rested directly within the trailer hitch receiver of the vehicle to permit the cargo bin to be pivoted using the trailer hitch receiver as a fulcrum. More particularly, the body portion of the retaining post can have a lower portion and an upper portion, and the shelf portion can extend distally from the lower portion of the retaining post beyond the upper portion of the retaining post. Still more particularly, the distal end of the retaining post can be mitered to have a recessed upper portion and an extended lower portion that projects distally beyond the recessed upper portion to form the shelf portion. The extended lower portion thus comprises the shelf portion that can be exploited to render pivoting into engagement with the trailer hitch receiver of the vehicle more convenient and less prone to inadvertent disengagement.

A further aspect of the invention can be characterized as a convertible, all-terrain gear cart towing system for establishing a towing relationship between a towing vehicle and a convertible, all-terrain gear cart that has a tow and control handle with an engaging portion. In such embodiments, the towing system may comprise a reverse hook structure for being retained by a posterior portion of the towing vehicle. The reverse hook structure comprises a first towing hook with an arcuate body portion for receiving the engaging portion of the tow and control handle. A latch member is provided for selectively being passed over the engaging portion of the tow and control handle once it is received within the arcuate body portion of the first towing hook. The latch member has a latched condition wherein the engaging portion of the tow and control handle is latched within the first towing hook and an unlatched condition wherein the engaging portion of the tow and control handle is not latched within the first towing hook. Under such constructions, the convertible, all-terrain gear cart can be selectively attached to the towing vehicle for towing by causing the engaging portion of the tow and control handle to be received and latching the engaging portion of the tow and control handle within the first towing hook by latching the latch member. Moreover, the convertible, all-terrain gear cart can be selectively detached from the towing vehicle by unlatching the latch member and removing the engaging portion of the tow and control handle from the first towing hook.

In embodiments of the invention, the latch member can comprise an elongate latch member, such as a flexible strap, with a first end portion retained in place proximal to a first portion of the first towing hook, a second end portion, and a body portion between the first and second end portions. A receiving latch is provided for selectively retaining the second end portion of the elongate latch member with the body portion of the elongate latch member overlying the engaging portion of the tow and control handle while the engaging portion of the tow and control handle is received within the first towing hook. The elongate latch member can have a retaining formation, such as a spherically shaped retaining formation, and the receiving latch can comprise a receiver, such as a receiving cup, for selectively receiving the retaining formation. Further, the receiving cup can have an anterior slot therein for permitting passage of the elongate latch member.

In preferred manifestations of the invention, the reverse hook structure further comprises a second towing hook disposed in parallel with the first towing hook. In such embodiments, the latch member can have a first end portion retained in place between the first and second towing hooks proximal to first portions of the first and second towing hooks, a second end portion, and a body portion between the first and second end portions. For instance, the first end portion of the latch member can be retained in place between the first and second towing hooks by a retaining structure that spans between the first and second towing hooks, and a receiving latch can be retained in place between the first and second towing hooks by a retaining structure that likewise spans between the first and second towing hooks.

According to practices of the invention, the reverse hook structure can be affixed to a towing rack that is in turn affixed to the towing vehicle. For instance, the towing rack can have a main frame with first and second frame portions with a spacing therebetween, and a support frame can be fixed atop the first and second frame portions. The reverse hook structure can be fixed to a posterior portion of the towing rack.

In other practices of the invention, the reverse hook structure is adapted for being hooked onto the towing vehicle. There, the first towing hook can be considered to comprise a first posterior towing hook, and the reverse hook structure can further comprise a first anterior attachment hook for being hooked onto the towing vehicle. The first anterior attachment hook and the first posterior towing hook are disposed in opposition. With this, the reverse hook structure can be readily retained relative to a towing vehicle by hooking the first anterior attachment hook to a portion of the towing vehicle, such as to a preexisting or specially-provided rack of a bicycle or other vehicle. Particular manifestations of such embodiments can further include a second posterior towing hook disposed in parallel with the first posterior towing hook and a second anterior attachment hook disposed in parallel with the first anterior attachment hook.

Still further, embodiments of the convertible, all-terrain gear cart are contemplated comprising a cargo bin with a cargo cage having an anterior frame portion, a posterior frame portion, a left frame portion, a right frame portion, and a bottom frame portion. A tow and control handle is coupled to the cargo bin, and first and second wheels are rotatably retained by the cargo bin. The posterior frame portion can comprise a rear tailgate for the gear cart that is pivotable between raised and lowered positions.

It is further disclosed that convertible, all-terrain gear carts according to the invention can comprise a cargo bin with a cargo cage having an anterior frame portion, a left frame portion, a right frame portion, a bottom frame portion that establishes a cargo bed, and a cargo bed extension structure. A tow and control handle can again be coupled to the cargo bin, and first and second wheels can be rotatably retained by the cargo bin. The cargo bed extension structure is adjustable from a retracted position to an extended position in which the cargo bed extension structure extends beyond the bottom frame portion of the cargo cage. For instance, the cargo bed extension structure can be pivotable or slidable between the retracted and extended positions. Where the cargo bed extension structure is slidable between retracted and extended positions, the cargo cage can further comprise a rear tailgate frame portion that is pivotably coupled to the distal end of the cargo bed extension structure to pivot between raised and lowered positions.

It is contemplated still further that embodiments of the gear cart can comprise a cargo cage with an anterior frame section, a left frame section, a right frame section, and a bottom frame section that establishes a cargo bed wherein the left, right, and anterior frame sections are independently pivotable relative to the bottom frame section. The gear cart can then be disposed in an expanded configuration, and the gear cart can be converted to a flatbed configuration by selectively pivoting the left and right cargo frame sections to collapsed positions resting atop the bottom frame section while the anterior frame section remains in an extended, use configuration. Still further, the gear cart can be converted to a storage condition by pivoting the anterior frame section to a collapsed position and, potentially, by detaching the first and second wheels from the cargo bin.

One will appreciate that the foregoing discussion broadly outlines the more important goals and features of the invention to enable a better understanding of the detailed description that follows and to instill a better appreciation of the inventors' contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

Figure 1:
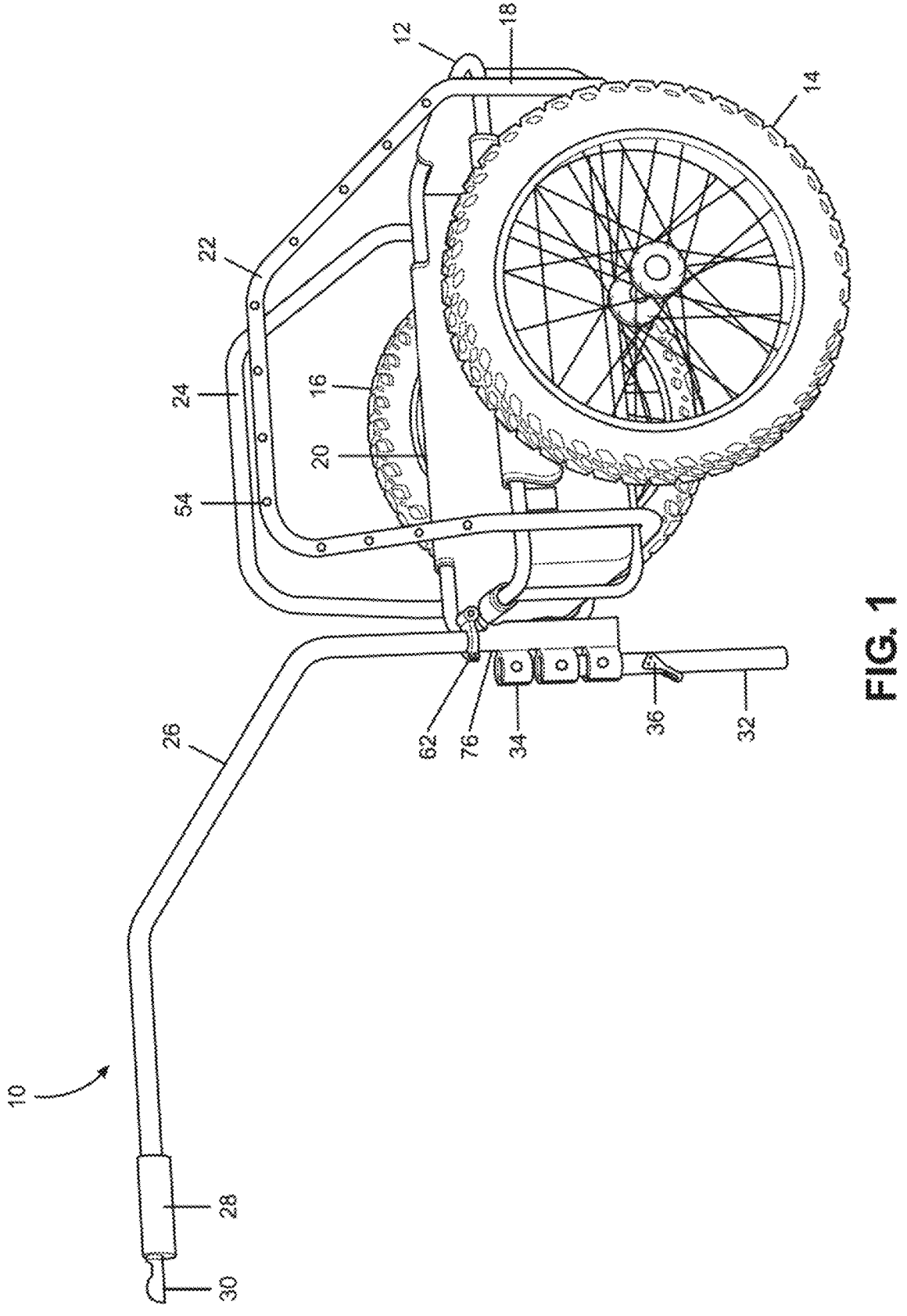
FIG. 1 is a perspective view of a convertible, all-terrain gear cart according to the present invention.

To ensure that one skilled in the art will be able to understand and, in appropriate cases, practice the present invention, certain preferred embodiments of the convertible, all-terrain gear cart revealed herein are described below and shown in the accompanying drawing figures. It will be understood, however, that the convertible, all-terrain gear cart is subject to a variety of further embodiments, each within the scope of the invention.

Looking more particularly to the drawings, embodiments of a convertible, all-terrain gear cart according to the present invention are indicated generally at 10 in FIGS. 1 through 6. There, the gear cart 10 can be considered to be founded on a cargo bin 12 with a first end, a second end, a first side, and a second side. A control arm 26 with a handle 28 is pivotally coupled to the first end of the cargo bin 12, and a slot receiver 40 is disposed to project from below the second end of the cargo bin 12. Both the control arm 26 and the receiver 40 are disposed in alignment with a longitudinal centerline of the cargo bin 12 and the convertible, all-terrain gear cart 10 in general. First and second accessory attachment and retention structures, which in this embodiment comprise cargo retention and roll bars 22 and 24, project upwardly from the first and second sides of the cargo bin 12, and a retractable support leg 32 is pivotally coupled to the first end of the cargo bin 12 in general alignment with the longitudinal centerline of the cargo bin 12. The gear cart 10 is supported for manual propulsion or trailering by first and second all-terrain wheels 14 and 16 that are rotatably retained at a mid-portion of the cargo bin 12 with aligned, lateral axes of rotation that are orthogonal to the longitudinal centerline of the gear cart 10. The all-terrain wheels 14 and 16 are readily detachable from the cargo bin 12, such as by spring-loaded mechanisms actuated by buttons disposed on the hubs of the wheels 14 and 16.

The cargo bin 12 in the depicted embodiment is formed with a cargo cage 18 that defines an inner cargo storage volume. Here, the inner cargo storage volume defined by the cargo cage 18 is rectangular in lateral cross section to have a length, a width, and a depth. The cargo cage 18 in this example has an upper rectangular frame portion, a lower rectangular frame portion, first and second spaced apart U-shaped longitudinal frame portions, and first and second spaced apart U-shaped lateral frame portions. Each of the frame portions is formed by one or more segments of rigid tubing, such as metal tubing. The frame portions are fixed together to form the cargo cage 18, such as by welding, by mechanical fasteners, or by any other effective method or combination thereof. The tip segments of the upturned first and second legs of each longitudinal frame portion are fixed to laterally communicating segments of the upper rectangular frame portion. The tip segments of the upturned first and second legs of each lateral frame portion are exposed and open and are fixed laterally outboard of longitudinally communicating segments of the upper rectangular frame portion.

A cargo liner 20 is received and retained by the cargo cage 18. In the present embodiment, the cargo liner 20 is rectangular in lateral cross section and substantially corresponds to the shape and size of the interior space bounded by the cargo cage 18. The cargo liner 20 has flap portions that overlie the lateral and longitudinal segments of the upper frame portion of the cargo cage 18 while a bottom of the cargo liner 20 is supported by the lower rectangular frame portion and the central segments of the U-shaped lateral and longitudinal frame portions of the cargo cage 18. The cargo liner 20 can be formed of one or more layers of flexible material, such as rubber, canvas, or any other suitable material or combination thereof. Alternatively, the cargo liner 20 can be formed of a rigid or semi-rigid material, such as a plastic or metal.

Figure 4:
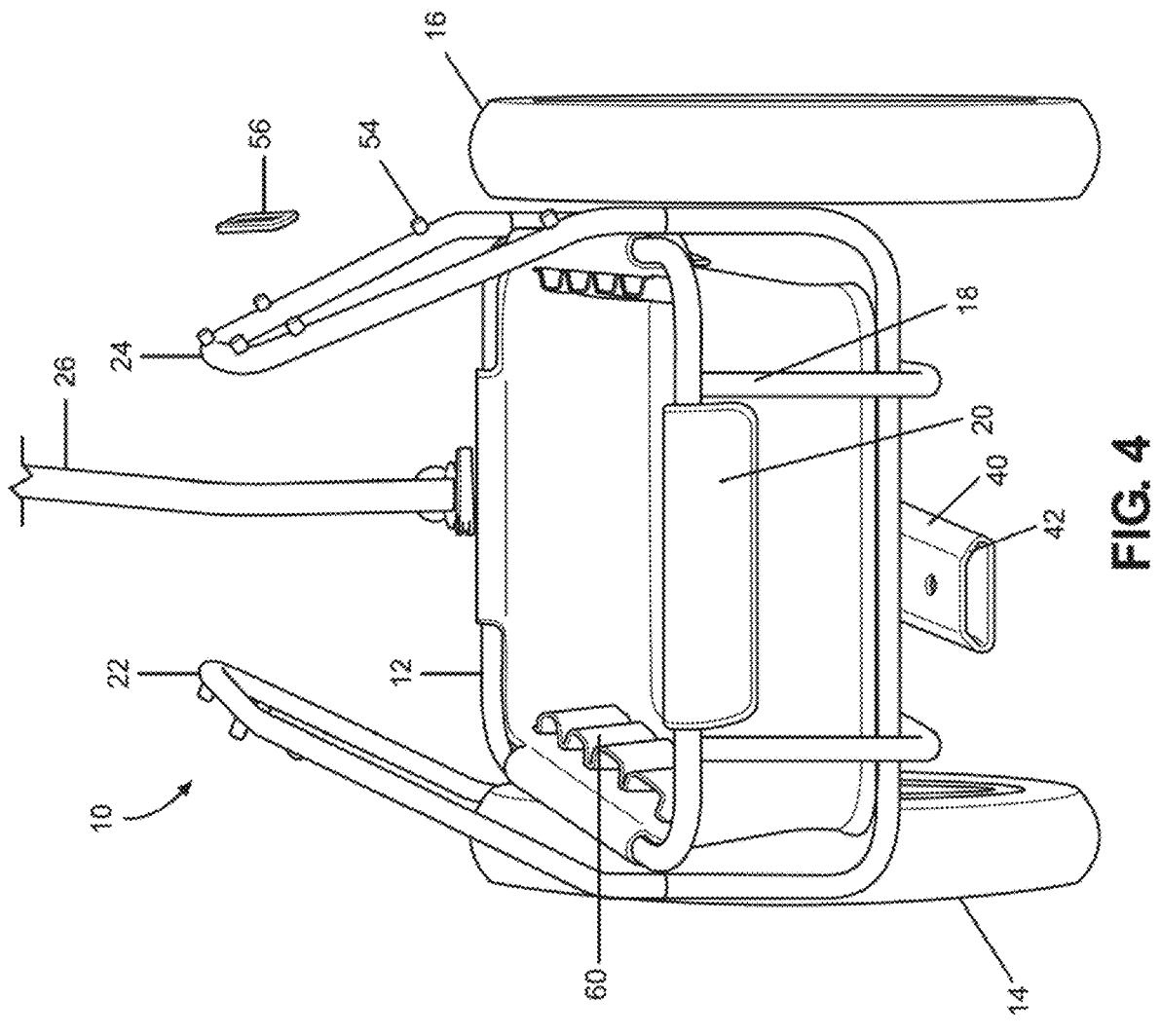
FIG. 4 is an alternative perspective view of the convertible, all-terrain gear cart of FIG. 1.
Figure 5:
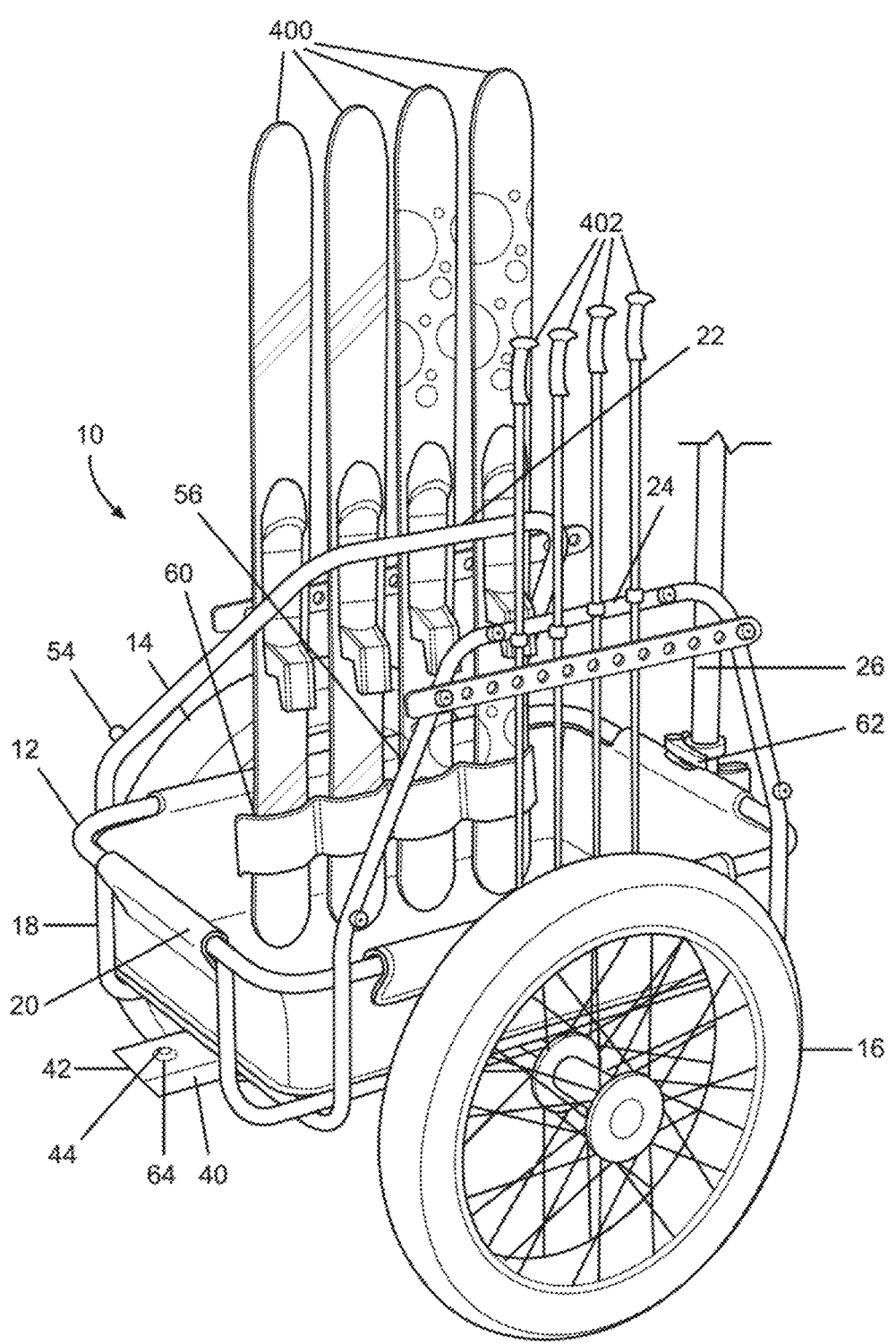
FIG. 5 is a further perspective view of the convertible, all-terrain gear cart of FIG. 1.

As best seen in FIGS. 4 and 5, for instance, plural pockets and sleeves 60 are spaced along the interior walls of the cargo liner 20. The pockets and sleeves 60 can be employed for receiving and retaining cargo. For instance, smaller articles can be inserted into a selected pocket or sleeve 60, and longer articles, such as sporting implements, umbrellas, or any other elongate articles, can employ one or more pockets or sleeves 60 to retain the lower ends thereof.

The first and second cargo retention and roll bars 22 and 24 or other accessory attachment and retention structures 22 and 24 can be removably and replaceably coupled to the cargo bin 12. Here, the roll bars 22 and 24 are generally U-shaped, each with a central segment, a first leg that projects generally perpendicularly to the central segment to terminate in a tip segment, and a second leg that projects from the central segment at an obtuse angle to terminate in a tip segment that is reverse angled to be approximately parallel to the tip segment of the first leg. Other accessory attachment and retention structures are within the scope of the invention. By way of further example and not limitation, the accessory attachment and retention structures 22 and 24 could alternatively be particularly adapted for retaining specific gear, such as snow boards, fishing poles, or any other articles. Also within the scope of the invention, the accessory attachment and retention structures 22 and 24 could be formed as a unit, or they could be crafted to support a storage container or one or more support shelves.

The tip segments of the first and second legs of the roll bars 22 and 24 are sized and spaced to be matingly engaged with the tip segments of the upturned first and second legs of the lateral frame portions of the cargo cage 18. For instance, as shown, the tip segments of the first and second legs of the roll bars 22 and 24 can be matingly received into the tip segments of the lateral frame portions of the cargo cage 18. The first and second legs of the roll bars 22 and 24 have aligned lateral bends therein so that, when the roll bars 22 and 24 are engaged with the cargo cage 18 as in FIG. 4 for example, the roll bars 22 and 24 angle inwardly toward the longitudinal centerline of the gear cart 10. Although not illustrated, the roll bars 22 and 24 can be oppositely disposed to be angled outwardly.

Each cargo retention and roll bar 22 and 24 has a plurality of retaining members 54 spaced therealong. The retaining members 54 can pursue a variety of configurations, such as hooks, posts with broadened tips, snap buttons, or any other effective retaining configuration. The gear cart 10 includes plural retaining straps 56 for engaging the roll bars 22 and 24 and the cargo bin 12 in general to secure articles in relation to the gear cart 10 for transport. In the depicted example, the retaining straps 56 comprise flexible straps, such as rubber straps, with a plurality of fastening apertures spaced therealong for selectively engaging the retaining members 54 of the roll bars 22 and 24. Under this construction, cargo can be retained by suitable placement, stretching, and attachment of the retaining straps 56 and potentially other fastening mechanisms spanning along or between the roll bars 22 and 24 to engage the fastening apertures of the straps 56 with retaining members 54 of the roll bars 22 and 24.

By the combined capabilities provided by the cargo retention and roll bars 22 and 24, the retaining members 54, the retaining straps 56, the sleeves and pockets 60, and the cargo bin 12 in general, a wide variety of cargo can be retained and transported by the all-terrain gear cart 10. By way of illustration, one can perceive by reference to FIG. 2 that hockey sticks 404 or other elongate and otherwise-shaped articles can be retained in a generally horizontal position supported by the roll bars 22 and 24 and fixed in place by the retaining straps 56. Alternatively, as FIG. 5 shows, skis 400 and ski poles 402 or other elongate or otherwise-shaped articles can be retained in a generally vertical position with ends thereof received into the sleeves or pockets 60, again supported by the roll bars 22 and 24 and retained in place by the retaining straps 56. Of course, the cargo that can be retained and transported by use of the gear cart 10 is unlimited as to type so that a person might just as readily retain and transport an umbrella or other gear for the beach, sporting implements for baseball, lacrosse, or any other sport, or gear for hunting or any other activity.

The control arm 26 has a proximal segment retained by the cargo bin 12, a central segment disposed at a non-zero angle relative to the proximal segment, and a distal segment disposed at a non-zero angle relative to the central segment and at a 90-degree angle relative to the proximal segment. With this, the distal segment can pursue a horizontal disposition while the proximal segment is disposed in a vertical disposition. The distal segment of the control arm 26 comprises a handle portion 28 and a trailer hitch connector 30.

The proximal segment of the control arm 26 is pivotally retained in relation to the cargo bin 12 by a control arm receiver tube 76 that is fixed to the first end of the cargo bin 12. In the depicted embodiment, the proximal end of the control arm 26 is matingly received into the control arm receiver tube 76. The control arm 26 is pivotable and adjustable in height in relation to the control arm receiver tube 76 and in relation to the cargo bin 12 in general. Where the cargo bin 12 is considered to be in a horizontal position when disposed as in FIG. 2, the receiver tube 76 is disposed in a vertical orientation, and the control arm 26 is selectively pivotable about a vertical pivot axis in relation to the cargo bin 12.

The control arm 26 can be selectively locked against pivoting and, additionally or alternatively, height adjustment by a locking mechanism 62. The locking mechanism 62 can conversely be employed to permit the control arm 26 to pivot and adjust in height. The locking mechanism 62 could pursue a variety of types. In the example shown in FIG. 2, for instance, the locking mechanism 62 comprises a clamping mechanism for clamping the proximal segment of the control arm 26 in place relative to the receiver tube 76, but numerous other mechanisms 62, such as locking pins, ball and spring detents, or any other effective mechanism, would occur to one skilled in the art after reviewing the present disclosure. Under such constructions, the control arm 26 can, for example, be pivoted 180 degrees from the use position of, for example, FIGS. 1 and 2 to the storage position of, for instance, FIG. 11C. Moreover, by release of the locking mechanism 62, the control arm 26 can be detached from the receiver tube 76 and the cargo bin 12, such as for storage or transport of the all-terrain gear cart 10.

The trailer hitch connector 30 disposed at the distal end of the control arm 26 could pursue different configurations within the scope of the invention. As illustrated, the trailer hitch connector 30 enables a coupling of embodiments of the all-terrain gear cart 10 to a trailering vehicle 300 for trailering as in FIG. 10, for instance. In the accompanying drawings, the trailering vehicle 300 is often depicted as a bicycle 300, but it will be appreciated that the trailer hitch connector 30 could be used to couple the all-terrain gear cart 10 to other manually-propelled or motorized vehicles, including all-terrain vehicles and nearly any other type of vehicle. In any case, the trailer hitch connector 30 is constructed to be selectively engaged with and retained by a corresponding trailer hitch connector 38 fixed to the trailering vehicle 300.

In the embodiment of FIGS. 2, 7, 8A, and 8B, the trailer hitch connector 30 at the distal end of the control arm 26 comprises a rubberized member with a longitudinal proximal rod portion, a distal rod portion formed integrally with and perpendicular to the proximal rod portion, and a receiving aperture 66 that passes centrally through the distal rod portion. The trailer hitch connector 38 for being fixed to the trailering vehicle 300 in this embodiment comprises a clamping portion 68 that is in the current example clamped about the seat post 302 of the bicycle 300. The trailer hitch connector 38 has a fixed retaining member 70, which here comprises a retaining post 70, and a locking arm 72 that can be selectively pivoted into and out of position overlying the distal end of the retaining post 70.

Figures 7, 8A, 8B:
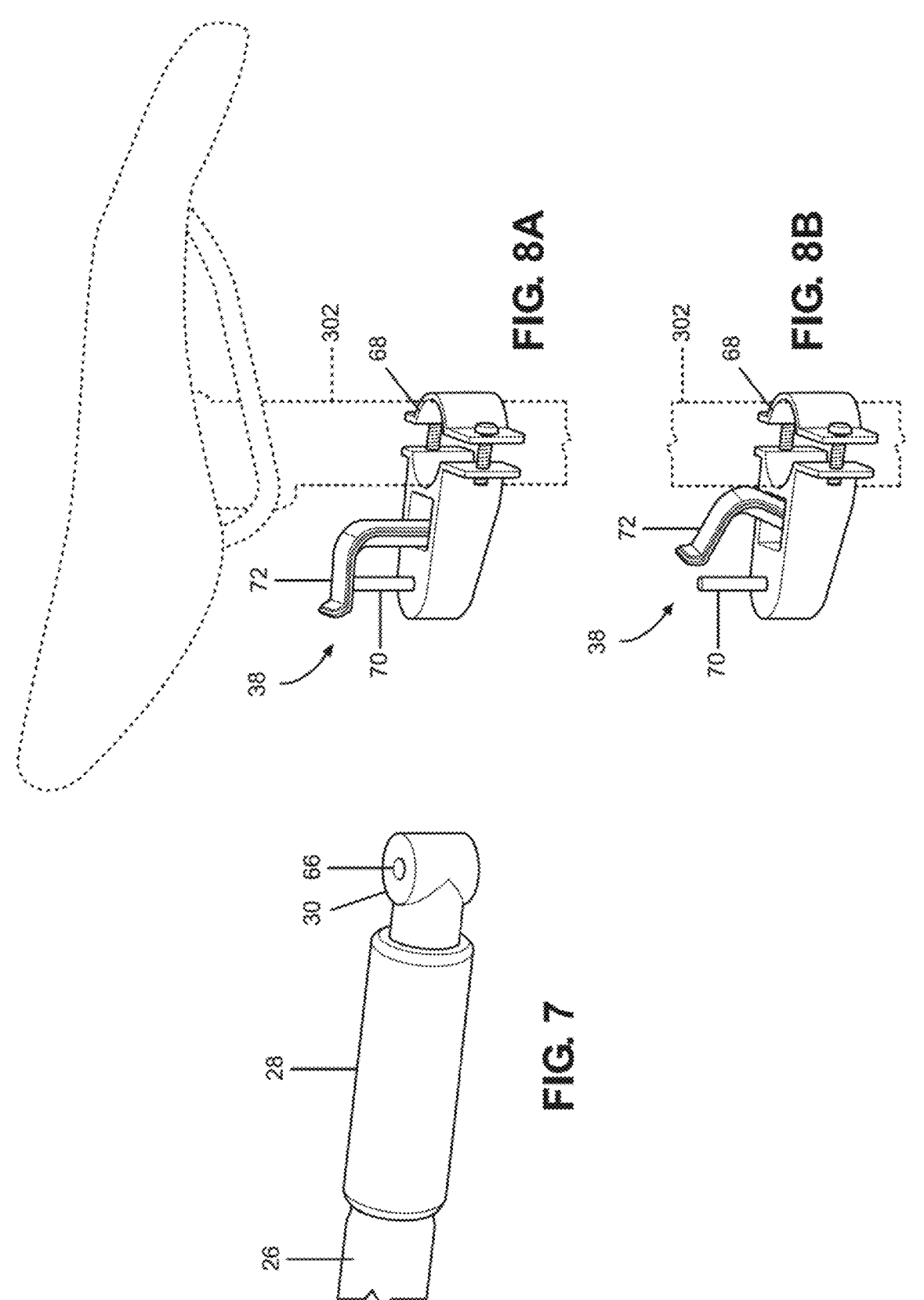
FIG. 7 is a perspective view of the handle and control arm hitch connector portions of the control arm for a convertible, all-terrain gear cart according to the invention.
FIGS. 8A and 8B are perspective views of bicycle hitch connector portions for a convertible, all-terrain gear cart as disclosed herein.

Under this construction, with the trailer hitch connector 38 fixed to the trailering vehicle 300 and the control arm 26 coupled with the cargo bin 12, a trailering connection can be established by inducing the locking arm 72 to a withdrawn position as in FIG. 8B, sliding the receiving aperture 66 of the trailer hitch connector 30 onto the retaining post 70, and then inducing the locking arm 72 to the locking position of FIG. 8A overlying the retaining post 70 and the trailer hitch connector 30. When the trailering connection with the trailering vehicle 300 is no longer required, the trailer hitch connectors 30 and 38 can be readily separated by inducing the locking arm 72 to the withdrawn position of FIG. 8B and sliding the receiving aperture 66 of the trailer hitch connector 30 out of engagement with the retaining post 70.

Figures 9A, 9B:
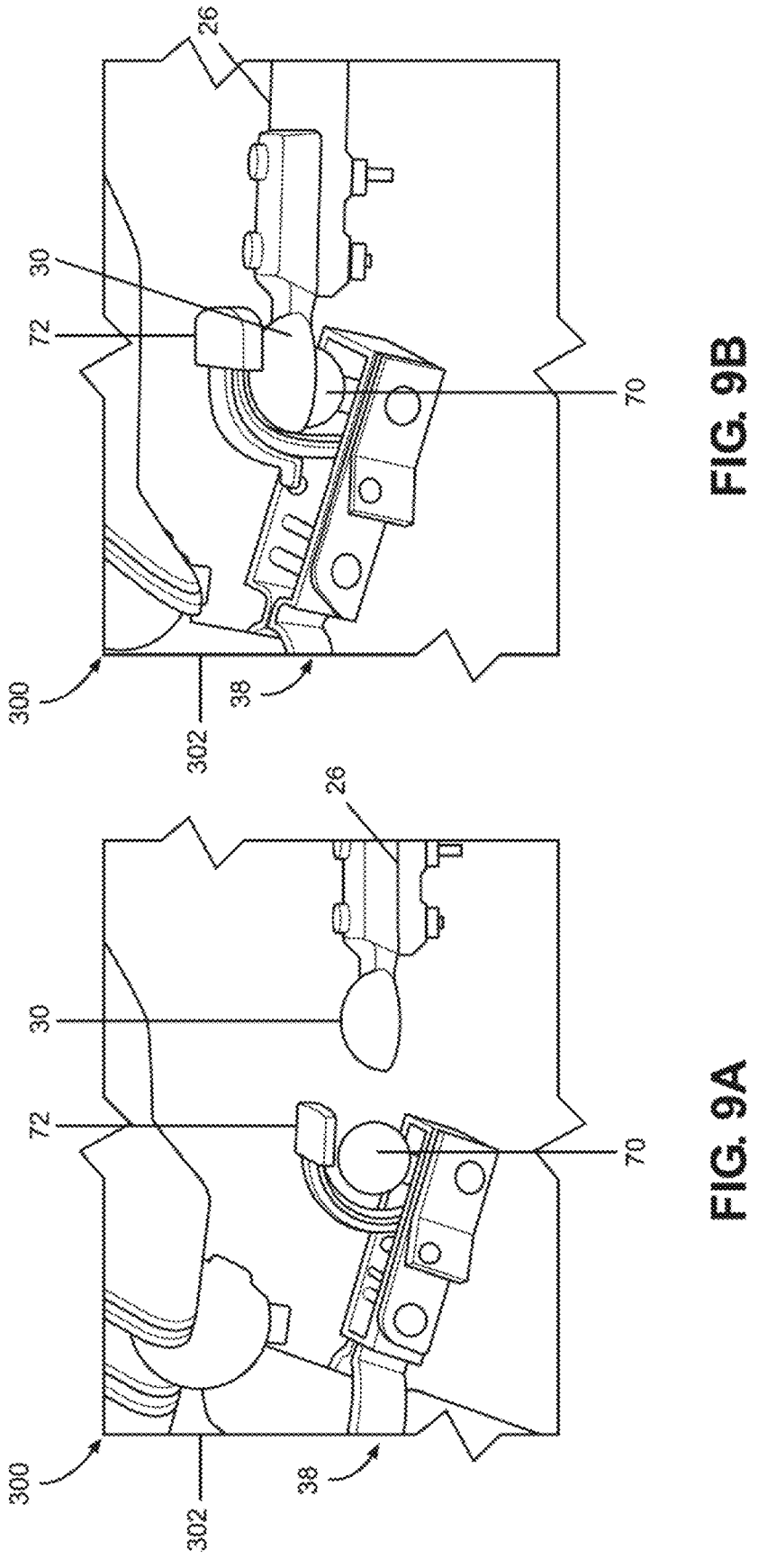
FIGS. 9A and 9B are progressive perspective views of the engagement of alternative bicycle hitch connector portions for a convertible, all-terrain gear cart pursuant to the invention.
Figure 14:
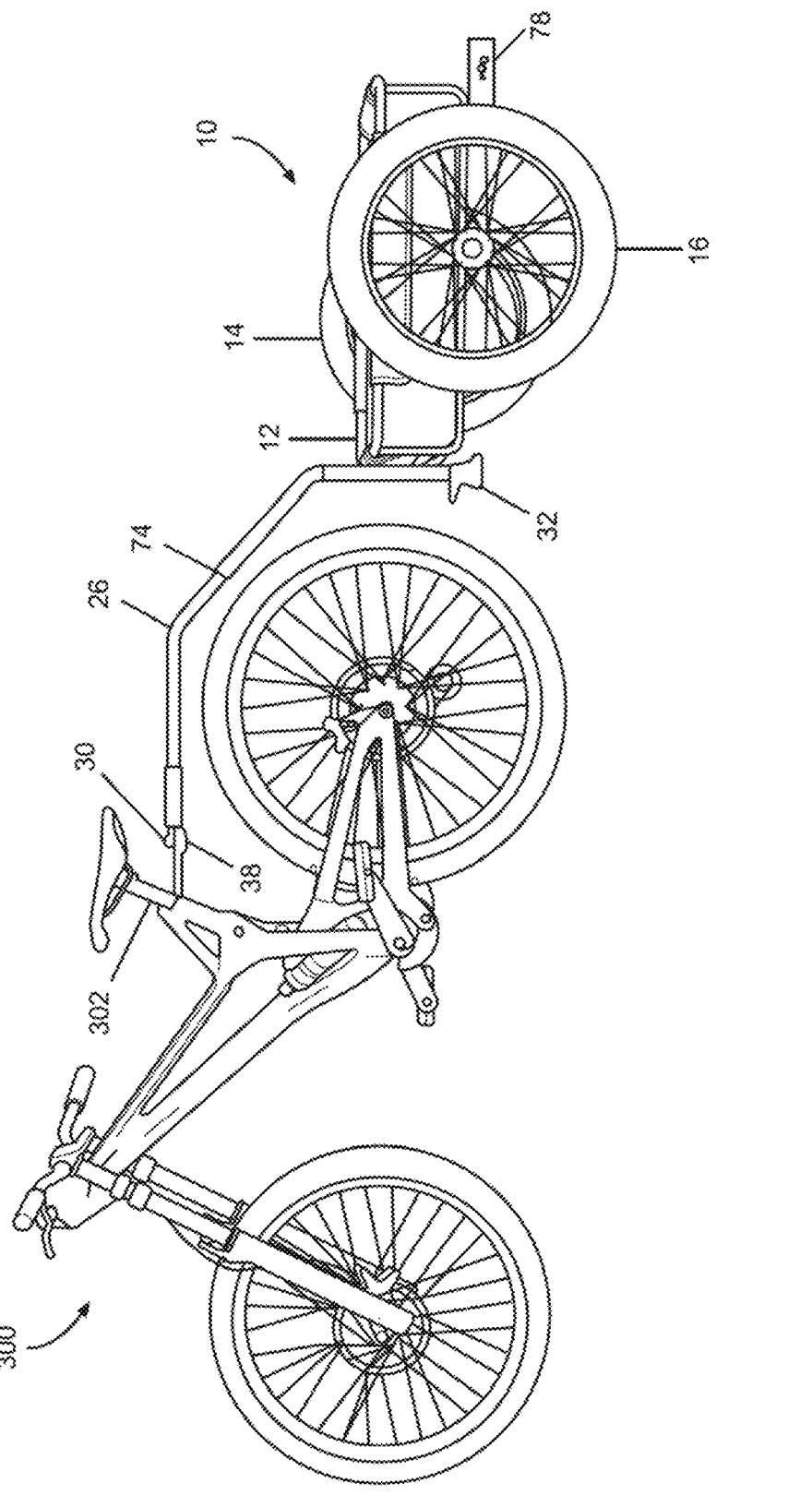
FIG. 14 is a view in side elevation of the convertible, all-terrain gear cart attached to a bicycle for towing.

An alternative trailer hitch connector combination 30 and 38 can be understood with additional reference to FIGS. 9A, 9B, and 14, for instance. There, the trailer hitch connector 30 retained at the distal end of the control arm 26 comprises a hemispherical member with a hemispherical cavity. The trailer hitch connector 38 fixed to the trailering vehicle 300, such as but not limited by clamping to the seat post 302 of a bicycle 300 as the trailering vehicle 300 again comprises a fixed retaining member 70. In this embodiment, the fixed retaining member 70 comprises a hemispherical retaining member 70 sized and shaped to be matingly received into the hemispherical cavity of the trailer hitch connector 30. A locking arm 72 again can be disposed, whether by pivoting into and out of position, by resiliency, or otherwise, to overlie the hemispherical member of the trailer hitch connector 30 as it is disposed atop the hemispherical retaining member 70 of the trailer hitch connector 38 to establish a trailering relationship between the trailering vehicle 300 and the all-terrain gear cart 10. The trailering coupling can be readily disengaged by retracting or otherwise adjusting the locking arm 72 and removing the hemispherical member of the trailer hitch connector 30 from the hemispherical retaining member 70 of the trailer hitch connector 38.

Figure 6:
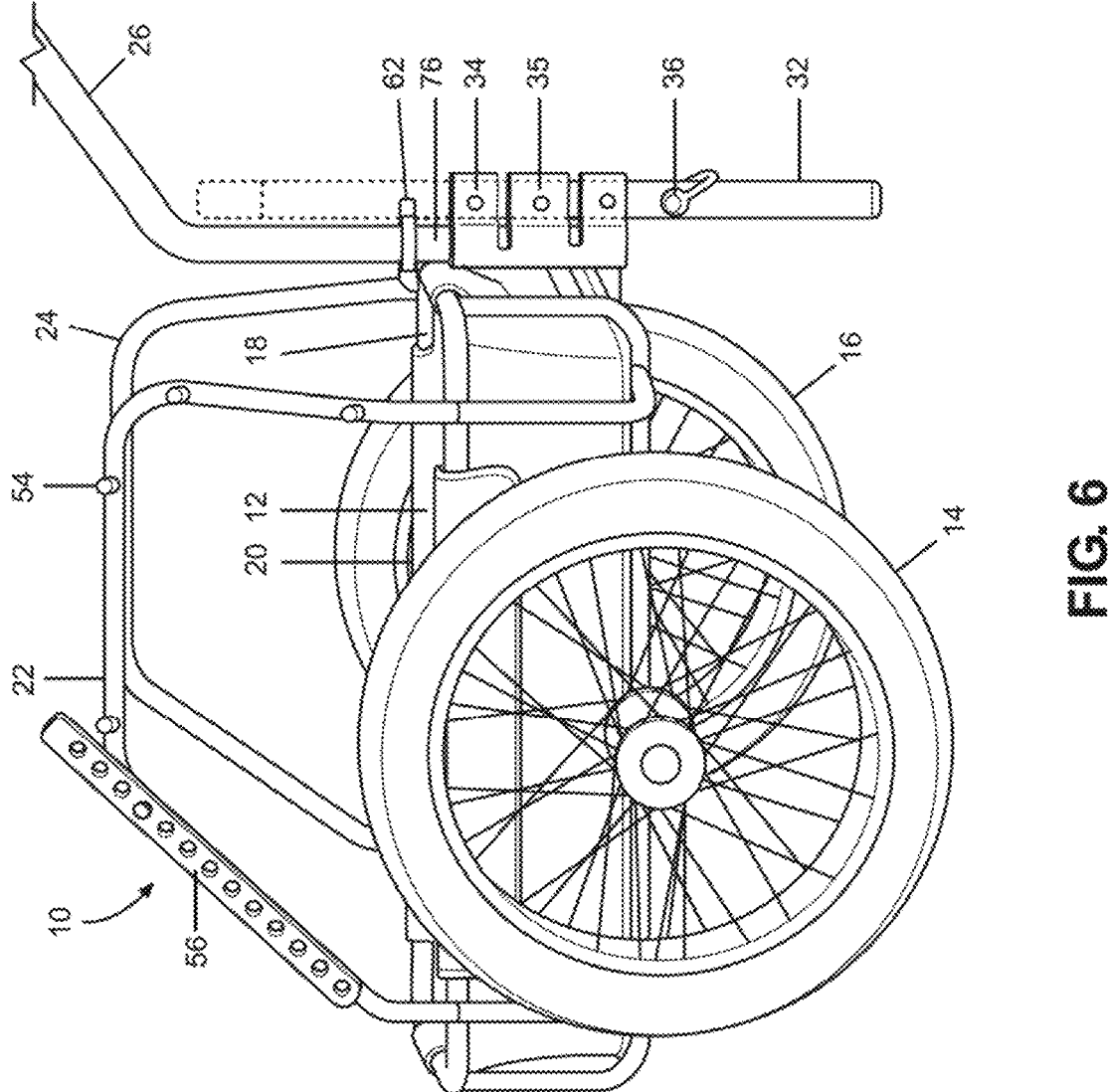
FIG. 6 is another perspective view of the convertible, all-terrain gear cart of FIG. 1.

With particular reference to FIG. 6, the gear cart 10 has a support leg 32. In certain embodiments, the support leg 32 can be fixed in position in which case the leg 32 may be of an abbreviated length. In the present embodiment, however, the support leg 32 can be adjusted from a support position extending downwardly from the cargo bin 12 to a retracted position. In the depicted manifestation, the support leg 32 is pivotably supported in relation to the cargo bin 12 by a support bracket 35. The support leg 32 can be retained in the support position or the retracted position by, for instance, a snap-fit engagement with upper and lower receiving latch portions 34 of the bracket 35. Additionally or alternatively, the support leg 32 can be retained in the support position or the retracted position by a locking pin 36 received by the support leg 32 and the bracket 35.

So constructed, the support leg 32 can be selectively adjusted to the support position to establish three points of support and stabilization for the gear cart 10, such as when the cart 10 is neither coupled for trailering relative to a bicycle 300 nor coupled for support and transport by a motor vehicle 200. When the support of the leg 32 is no longer required, such as when the gear cart 10 is to be manually propelled, trailered, or supported by a motor vehicle, the support leg 32 can be adjusted to the retracted position and secured there by the receiving latch 34 and, potentially, the locking pin 36.

Figure 2:
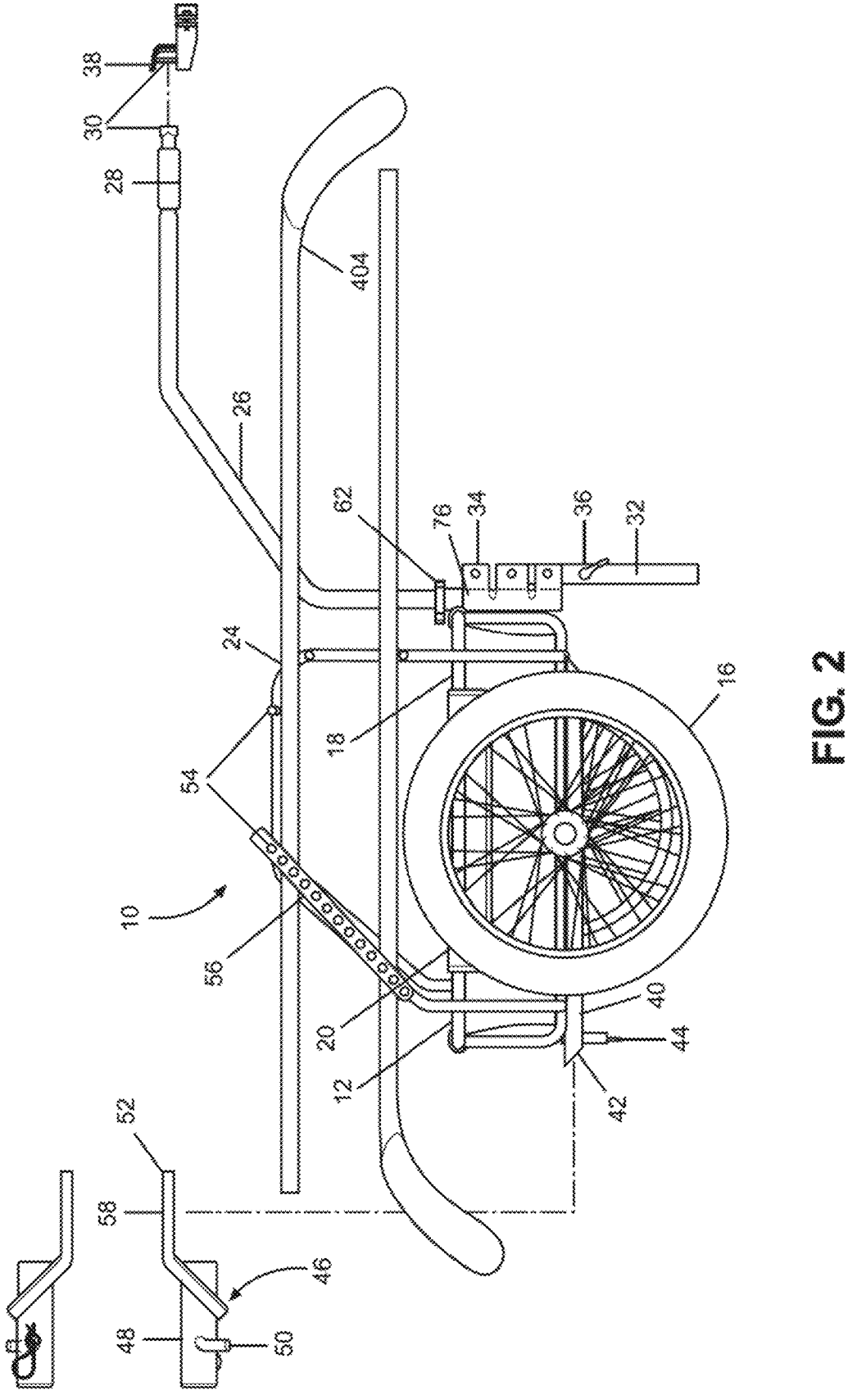
FIG. 2 is a view in side elevation of the convertible, all-terrain gear cart of FIG. 1.
Figure 3:
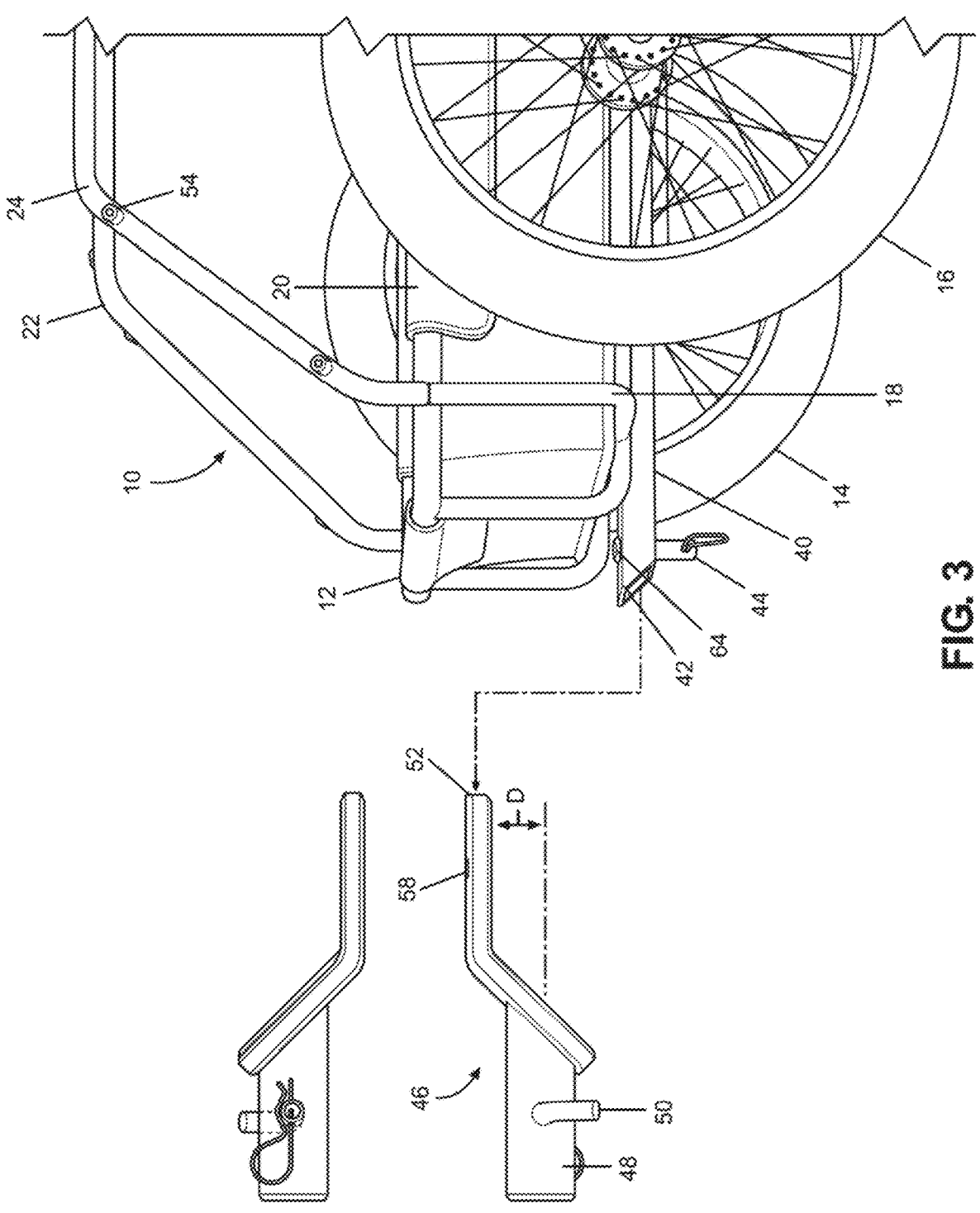
FIG. 3 is a lateral perspective view of the convertible, all-terrain gear cart of FIG. 1.

Turning more particularly to FIGS. 2 and 3, the slot receiver 40 and its engagement with a trailer hitch adapter 46 according to the invention can be more fully understood. As set forth above, the slot receiver 40 is disposed to project longitudinally from below the second end of the cargo bin 12. There, the slot receiver 40 comprises a rigid sleeve, such as but not limited to a sleeve of metal, fixed to the lower portion of the cargo cage 18. The slot receiver 40 traverses from its distal end projecting beyond the second end of the cargo bin 12 to its proximal end adjacent to the first end of the cargo bin 12. The distal end of the slot receiver 40 is mitered to have a recessed lower portion and an overhanging upper portion that projects distally beyond the recessed lower portion. The overhanging upper portion of the distal end of the slot receiver 40 thus comprises a distally projecting shelf 42. Apart from its mitered distal end, the slot receiver 40 has a rectangular cross section that has a greater width dimension than its height dimension. With that, the portion of the slot receiver 40 proximal to the mitered distal end comprises a narrow slot opening. The slot receiver 40 has an aperture 64 that extends vertically therethrough adjacent to but spaced from the distal end of the slot receiver 40, and a locking pin 44 can be selectively disposed through the aperture 64.

With additional reference to FIGS. 3, 11A, 11B, and 11C, for example, a trailer hitch adapter 46 is particularly designed to establish a reliable, stable supporting engagement between a trailer hitch receiver 202 of a motor vehicle 200 and the slot receiver 40 of the gear cart 10. The trailer hitch adapter 46 has a rectangular bar portion 48 for being received into the trailer hitch receiver 202 of the motor vehicle 200. A pin 50 can be selectively passed through the trailer hitch receiver 202 and the bar portion 48 received therein to lock the trailer hitch adapter 46 in place.

As shown in FIG. 3, the bar portion 48 of the trailer hitch adapter 46 has a longitudinal centerline, and a rigid tongue 52 fixedly projects from the bar portion 48 in parallel to but offset from the longitudinal centerline by a distance D. As such, the trailer hitch adapter 46 can be inserted into a trailer hitch receiver 202 with the rigid tongue 52 disposed below the longitudinal centerline of the bar portion 48 or with the rigid tongue 52 disposed above the longitudinal centerline to adjust the effective height of the rigid tongue 52 by twice the distance D.

The rigid tongue 52 is sized and shaped to be closely received into the slot receiver 40. The tongue 52 has an aperture 58 therethrough to permit the gear cart 10 and the trailer hitch adapter 46 to be locked together by passage of the pin 44 through the apertures 58 and 64 in the trailer hitch adapter 46 and the slot receiver 40.

So constructed, the convertible, all-terrain gear cart 10 can be readily converted between modes of manual propulsion, trailering, and support by a motor vehicle. With the cargo cage 18 and first and second cargo retention and roll bars 22 and 24 supported by all-terrain wheels 14 and 16, the gear cart 10 can readily traverse varied terrain whether propelled manually as by gripping the control arm 26 or by being trailered behind a bicycle or other trailering vehicle 300. The gear cart 10 can do so while stably supporting and retaining widely varied cargo in a protective cage structure. Moreover, as is described further hereinbelow, by the interaction of the slot receiver 40 and the tongue 52 of the trailer hitch adapter 46, the gear cart 10 can be stably and reliably pivoted into and out of supported engagement with a trailer hitch receiver 202 of a motor vehicle 200 with minimized risk of inadvertent disengagement. Where necessary, such as when the convertible gear cart 10 is in manual propulsion mode not coupled to a trailering vehicle 300 and not supported by a motor vehicle 200, the support leg 32 can be readily employed to establish three points of support for the gear cart 10 to retain and support articles in an elevated, stabilized manner.

Figure 10:
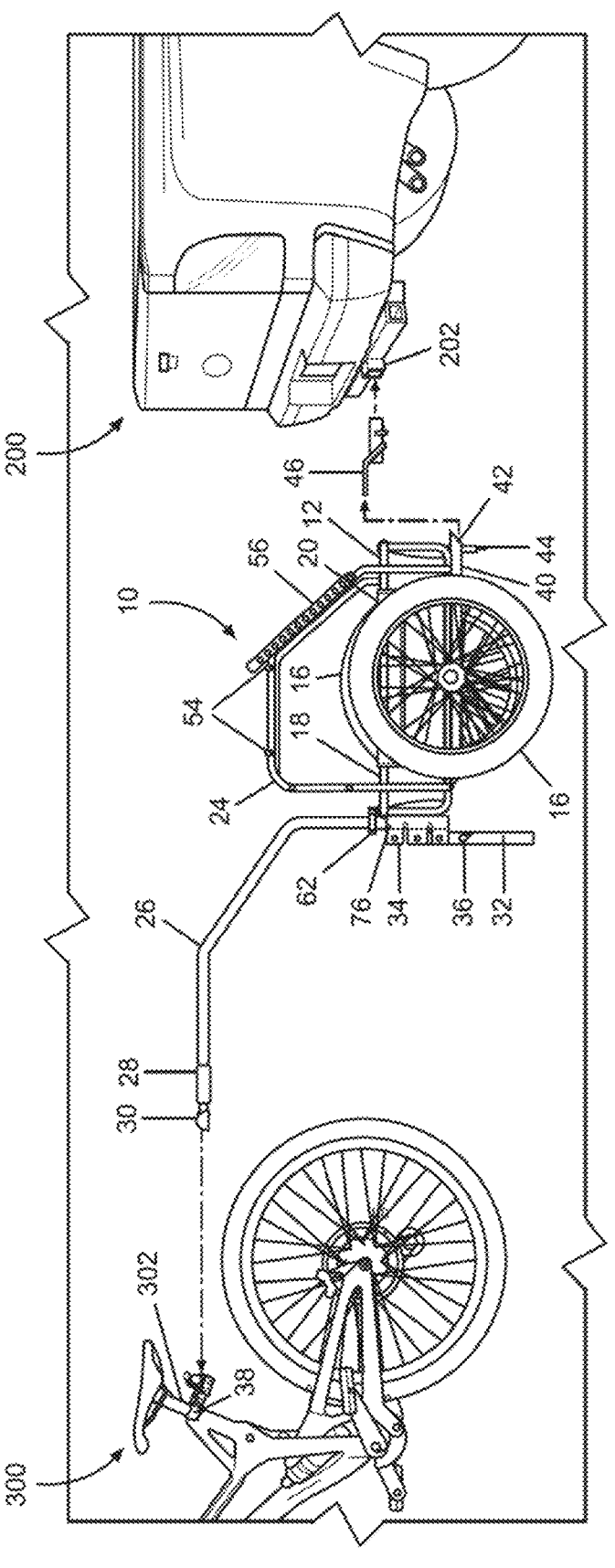
FIG. 10 is a perspective view of the convertible, all-terrain gear cart depicting options for bicycle trailering, manual propulsion, and vehicle mounting.

With further reference to FIG. 10, the multi-functionality of the convertible, all-terrain gear cart 10 can be further appreciated. As suggested therein, a user can readily grip the handle 28 of the control arm 26 to push or pull the gear cart 10 by hand. The gear cart 10 and any gear supported thereby can be manipulated over a wide variety of terrain surfaces in a stable and secure manner. When trailering behind a bicycle 300 or other trailering vehicle 300 is desired, the trailer hitch connector 30 at the distal end of the control arm 26 can be engaged and retained by the trailer hitch connector 38 fixed to the bicycle 300. When it is desired to transport the gear cart 10 and, potentially, cargo retained by the gear cart 10 by motor vehicle 200, such as might be desirable over longer distances, the gear cart 10 can be engaged with and supported by the vehicle 200 by reception of the tongue of the trailer hitch adapter 46 into the slot receiver 40 of the cargo bin 12.

Figures 11A, 11B, 11C:
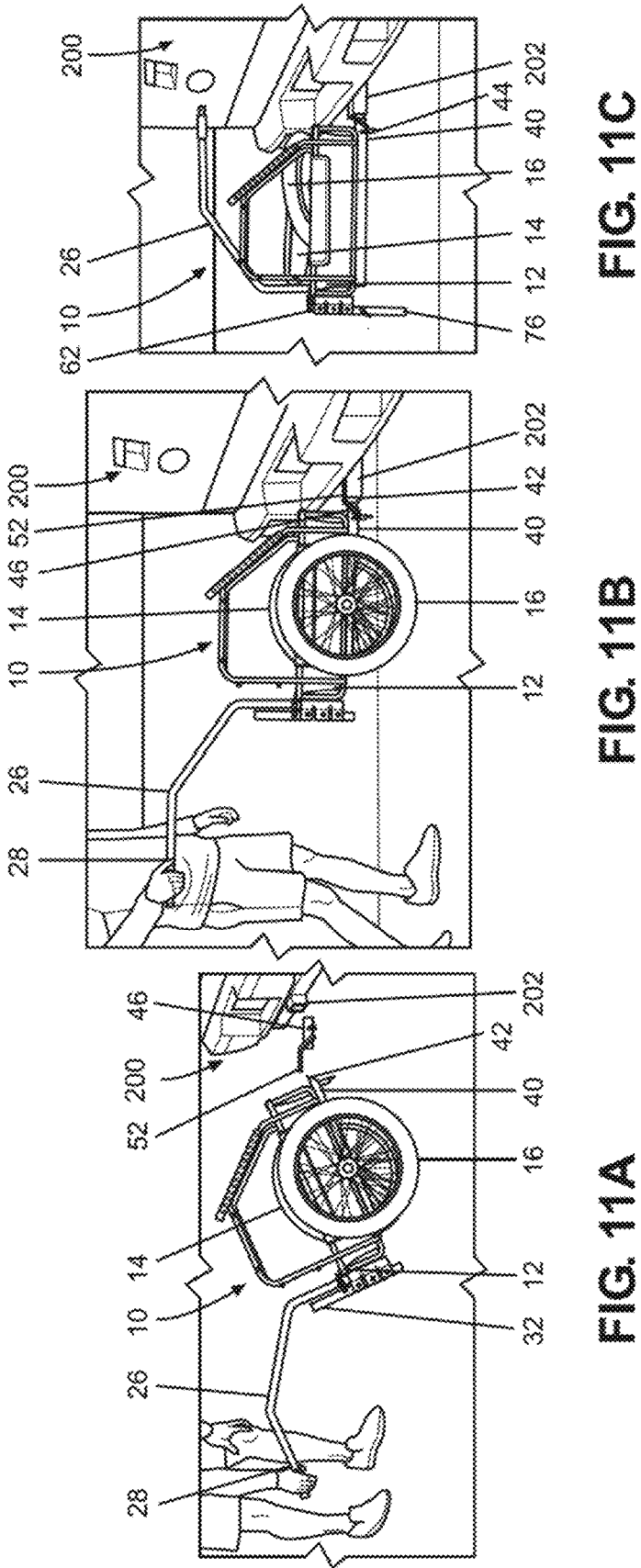
FIGS. 11A, 11B, and 11C are progressive views of the engagement of the convertible, all-terrain gear cart with a motor vehicle.

Possible steps in converting the all-terrain gear cart 10 from use as a manually-propelled unit to being supported by a motor vehicle 200 can be more fully understood with reference to FIGS. 11A, 11B, and 11C. In FIG. 11A, the gear cart 10 is configured for manual propulsion with the control arm 26 pivoted to a use orientation extending longitudinally from the cargo bin 12. A trailer hitch adapter 46 is locked in place with the bar portion 48 thereof locked within the trailer hitch receiver 202 of the motor vehicle 200. With the control arm 26 in the use orientation and with the all-terrain wheels 14 and 16 coaxially disposed at a mid-portion of the cargo bin 12, the control arm 26 can be pressed downwardly and thereby employed to pivot the cargo bin 12 about the wheels 14 and 16 to cause the first end of the cargo bin 12 to move downwardly while the second end of the cargo bin 12 and the distal end of the slot receiver 40 retained thereby pivot upwardly. With the gear cart 10 so pivoted, the distally projecting shelf 42 of the mitered end of the slot receiver 40 can be stably rested atop the rigid tongue 52 of the trailer hitch adapter 46. Both the slot receiver 40 and the rigid tongue 52 are appreciably wider than they are thick or tall. The rigid tongue 52 could also be described as a rigid plate 52. The tongue 52 has flat upper and lower faces, which change as to which is upper and which is lower depending on the orientation of the trailer hitch adapter 46, and the rectangular nature of the slot receiver 40 forms the distally projecting shelf 42 likewise to be flat. So formed, the tongue 52 presents a flat stabilizing surface on which the flat distally projecting shelf 42 of the slot receiver 40 can rest so that a stable relationship is established that resists inadvertent disengagement or flipping of the gear cart 10 relative to the trailer hitch adapter 46.

With the distally projecting shelf 42 and the rigid tongue 52 so engaged, the mechanical advantage of the longitudinally extending control arm 26 can be exploited as a lever as in FIG. 11B to pivot the gear cart 10 upwardly by lifting the control arm 26 by the handle 28 and using the rigid tongue 52 as a fulcrum. The user need not directly lift the entire weight of the gear cart 10 and any gear retained thereby. The gear cart 10 can be pivoted until the slot receiver 40 is in longitudinal alignment with the rigid tongue 52. However, it will be noted that even excess pivoting beyond that longitudinal alignment will not tend to disengage the distally projecting shelf 42 from the rigid tongue 52. This is a marked differentiation from prior art structures using square engaging members to engage square receivers so that excess pivoting could well inadvertently disengage the engaging member from the receiver resulting in risks to the vehicle, the user, and any retained gear.

With the slot receiver 40 aligned with the rigid tongue 52, the gear cart 10 can be slid toward the vehicle to cause the tongue 52 to be received into the slot receiver 40 until the apertures 58 and 64 of the tongue 52 and the slot receiver 40 are aligned. Then, the pin 44 can be inserted through the apertures 58 and 64 to lock the tongue 52 within the slot receiver 40 and to lock the gear cart 10 in a position stably supported by the vehicle 200. With the gear cart 10 fixed in place, the control arm 26 can be pivoted 180 degrees and locked by the clamping mechanism 62 in the storage position of FIG. 11C. In the storage position, the central and distal segments of the control arm 26 overlie the cargo bin 12 of the gear cart 10. Where desired, the all-terrain wheels 14 and 16 can be readily removed, such as by pressing on release buttons or otherwise.

To similar advantage, the steps can be reversed to enable the gear cart 10 to be stably and reliably disengaged from the motor vehicle 200. For instance, the control arm 26 can be pivoted 180 degrees to the use position of FIG. 11B, and, if necessary, the wheels 14 and 16 can be reattached. The locking pin 44 can be removed, and the gear cart 10 can be slid away from the vehicle 200 until the distally extending shelf 42 overlies the distal end of the tongue 52. Again to some advantage, the risk of premature disengagement of the gear cart 10 from the vehicle 200 is minimized in that the user has the opportunity by virtue of the mitered nature of the end of the slot receiver 40 to perceive visually and mechanically the presence of the distal end of the tongue 52 as it overlaps the distally extending shelf 42 before the tongue 52 is entirely removed from the slot receiver 40. Then, the gear cart 10 can be pivoted downwardly, again using the rigid tongue 52 as a fulcrum, until the wheels 14 and 16 safely rest on the ground surface. The slot receiver 40 can then be fully disengaged from the tongue 52, and the gear cart 10 can be manually propelled by gripping the handle 28 of the control arm 26. Alternatively, the gear cart 10 can be attached for trailering relative to a bicycle or other trailering vehicle 300, or the gear cart 10 can simply be supported in a substantially upright position by deployment of the support leg 32.

Where a relatively lower disposition of the gear cart 10 in relation to the motor vehicle 200 is desired, the trailer hitch adapter 46 can be oriented with the rigid tongue 52 above the longitudinal centerline of the trailer hitch adapter 46. Conversely, where a relatively higher disposition of the gear cart 10 in relation to the motor vehicle 200 is sought, the trailer hitch adapter 46 can be oriented with the rigid tongue 52 below the longitudinal centerline of the trailer hitch adapter 46.

A further embodiment of the convertible, all-terrain gear cart 10 is depicted in FIGS. 12 through 16B. The gear cart 10 is again founded on a cargo bin 12. A control arm 26 with a handle 28 is pivotally coupled to the first end of the cargo bin 12 to pivot about a vertical axis of rotation. In the present embodiment, as best perceived perhaps in FIGS. 16A and 16B, an extendable and retractable retaining post 78, which is rectangular in cross section, is fixed to the lower surface of the cargo bin 12. The control arm 26 and the retaining post 78 are disposed in alignment with a longitudinal centerline of the cargo bin 12 and the convertible, all-terrain gear cart 10 in general. A retractable support leg 32, which in this embodiment slides longitudinally between extended and retracted positions, is coupled to the first end of the cargo bin 12 in general alignment with the longitudinal centerline of the cargo bin 12. First and second all-terrain wheels 14 and 16 are rotatably retained at a mid-portion of the cargo bin 12 to have aligned, lateral axes of rotation that are orthogonal to the longitudinal centerline of the gear cart 10. The all-terrain wheels 14 and 16 are again detachable.

A cargo cage 18 of the cargo bin 12 defines an inner cargo storage volume that is rectangular in lateral cross section with a length, a width, and a depth. The cargo cage 18 again has an upper rectangular frame portion, a lower rectangular frame portion, first and second spaced apart U-shaped longitudinal frame portions, and first and second spaced apart U-shaped lateral frame portions that are fixed together to form the cargo cage 18. The tip segments of the upturned first and second legs of each longitudinal frame portion are fixed to laterally communicating segments of the upper rectangular frame portion, and the tip segments of the upturned first and second legs of each lateral frame portion are fixed to longitudinally communicating segments of the upper rectangular frame portion.

A cargo liner 20 is again received and retained by the cargo cage 18. The cargo liner 20 substantially corresponds in shape and size to that of the interior space bounded by the cargo cage 18 with flap portions overlying the lateral and longitudinal segments of the upper frame portion of the cargo cage 18 and a bottom of the cargo liner 20 supported by the lower rectangular frame portion and the central segments of the U-shaped lateral and longitudinal frame portions of the cargo cage 18. As before, the cargo liner 20 can be of any suitable material or materials, and the cargo that can be retained and transported by use of the gear cart 10 is unlimited as to type.

The control arm 26 has a proximal segment pivotally retained relative to the cargo bin 12 by a control arm receiver tube 76 fixed to the first end of the cargo bin 12. A central segment of the control arm 26 is disposed at a non-zero angle relative to the proximal segment, and a distal segment of the control arm 26 is disposed at a non-zero angle relative to the central segment and at a 90-degree angle relative to the proximal segment. The distal segment of the control arm 26 comprises a handle portion 28 and a trailer hitch connector 30, which in this non-limiting example comprises a hemispherical member with a hemispherical cavity with it again being noted that other trailer hitch connectors 30 can be employed within the scope of the invention.

The control arm 26 is pivotable and can be adjustable in height in relation to the control arm receiver tube 76 and thus in relation to the cargo bin 12. Moreover, a length adjustment connection 74 can be provided along the control arm 26, such as in the central segment of the control arm 26 as in the depicted embodiment, to permit an adjustment of the distance between the trailer hitch connector 30 and the cargo bin 12 and also to permit an adjustment of the height of the distal segment of the control arm 26 and the trailer hitch connector 30. The control arm 26 again can be selectively locked against pivoting and, additionally or alternatively, against height adjustment and conversely permitted to pivot and adjust in height by one or more clamping mechanisms or locking pins, ball and spring detents, or any other effective mechanism. The control arm 26 can thus be pivoted 180 degrees from the use position of, for example, FIGS. 12 and 13 to the storage position of, for instance, FIG. 15C. Moreover, the control arm 26 is detachable from the receiver tube 76 and the cargo bin 12, including to permit storage or transport of the all-terrain gear cart 10.

Figures 16A, 16B:
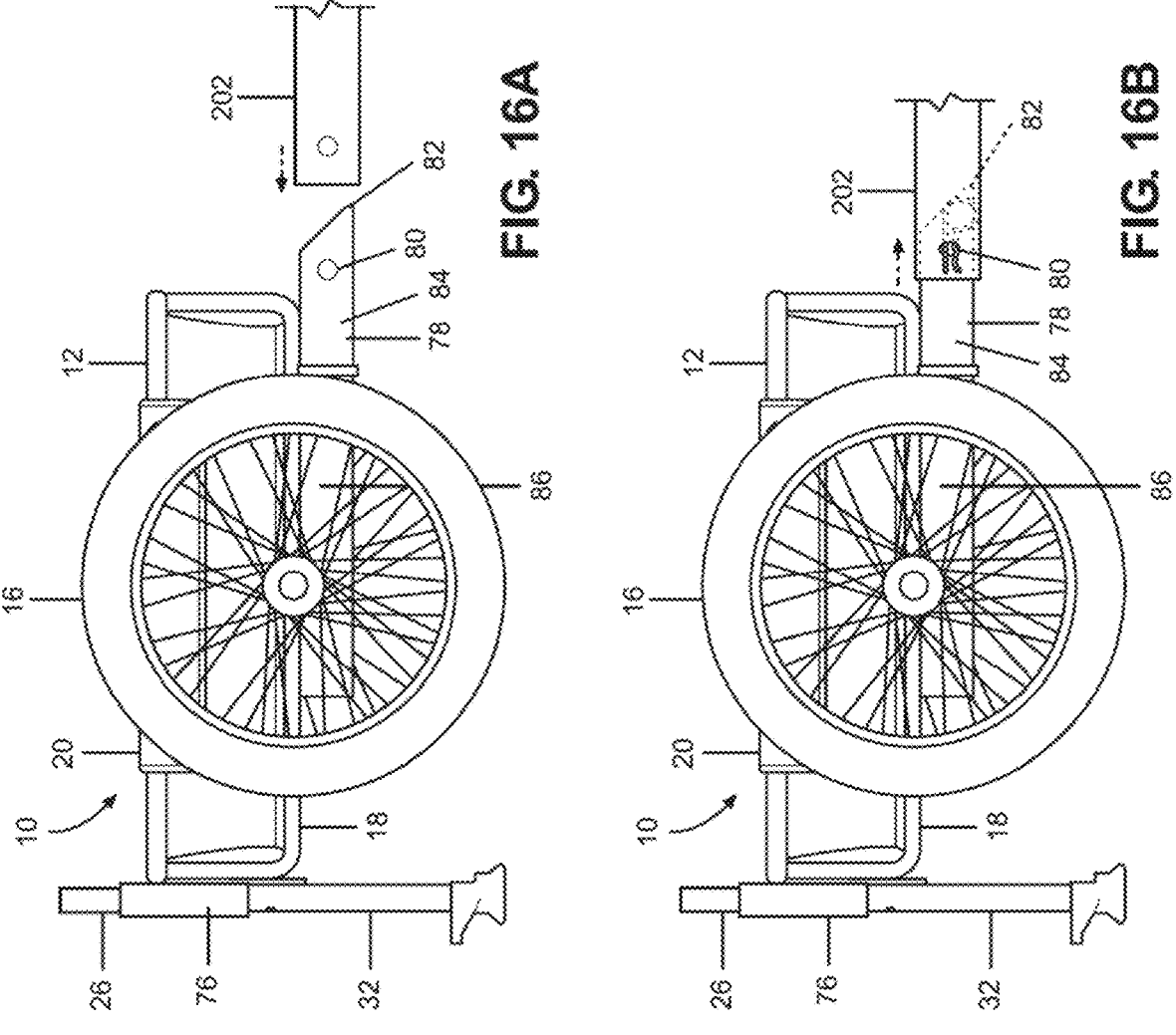
FIGS. 16A and 16B are further progressive views in side elevation of the engagement of the convertible, all-terrain gear cart of FIG. 12 with a motor vehicle.

Looking further to FIGS. 16A and 16B, the retaining post 78 and its engagement with a trailer hitch receiver 202 of a motor vehicle 200 can be further understood. The retaining post 78 has a retracted position as in FIG. 16A and an extended position as in FIG. 16B where the distal portion of the retaining post 78 projects substantially beyond the second end of the cargo bin 12. The retaining post 78 comprises a first rigid sleeve 84 extendably and retractably coupled with a second rigid sleeve 86. The sleeves 84 and 86 can be of metal or any other suitable material, and the sleeves 84 and 86 can have rectangular cross sections with the first sleeve 84 sized and shaped in cross section to match the size and shape of the trailer hitch receiver 202. A locking pin 80 can be selectively received through aligned apertures in the first sleeve 84 and the trailer hitch receiver 202 thereby to lock the retaining post 78 in place within the trailer hitch receiver 202.

Figure 12:
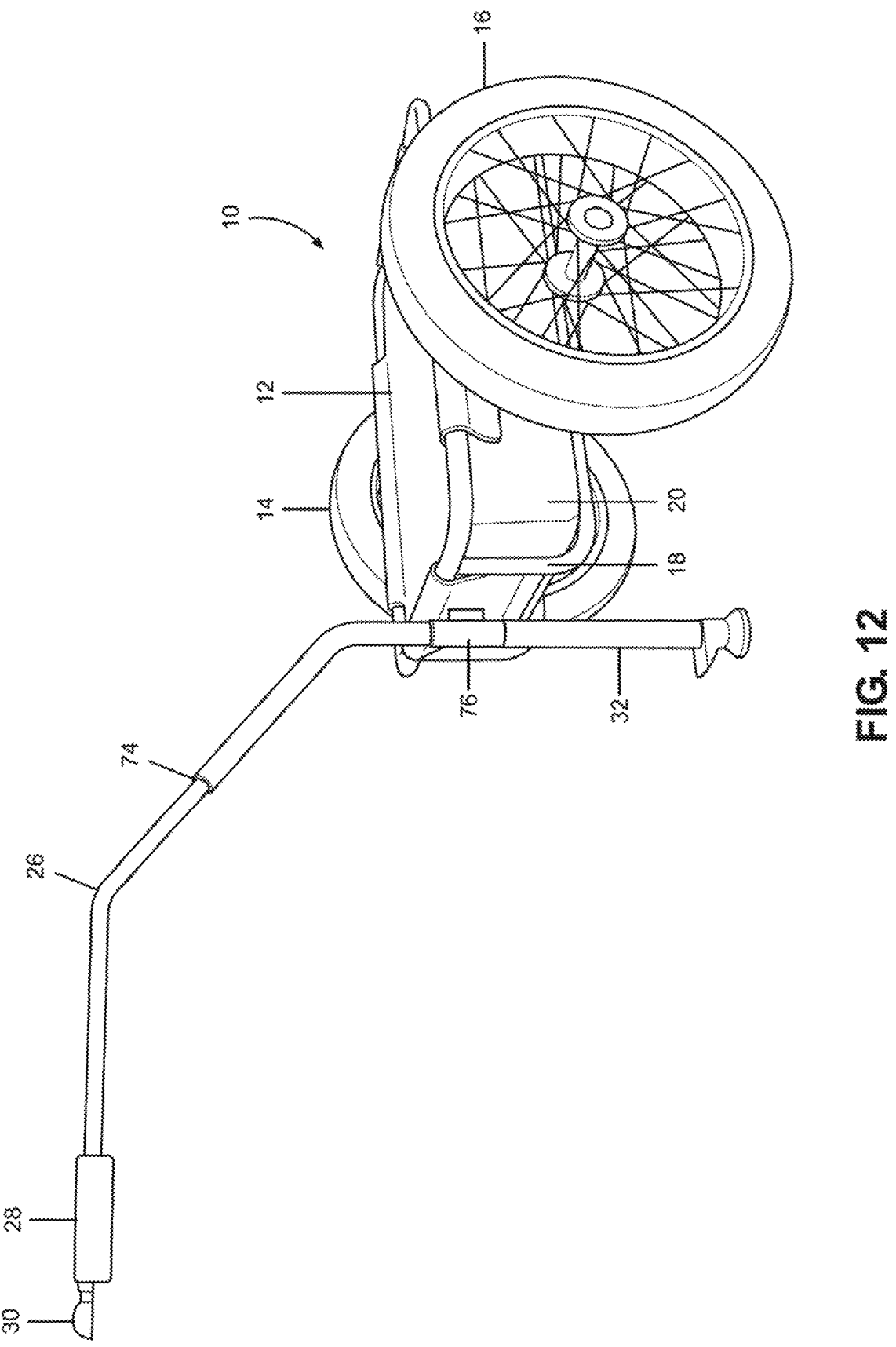
FIG. 12 is a perspective view of an alternative embodiment of the convertible, all-terrain gear cart.
Figure 13:
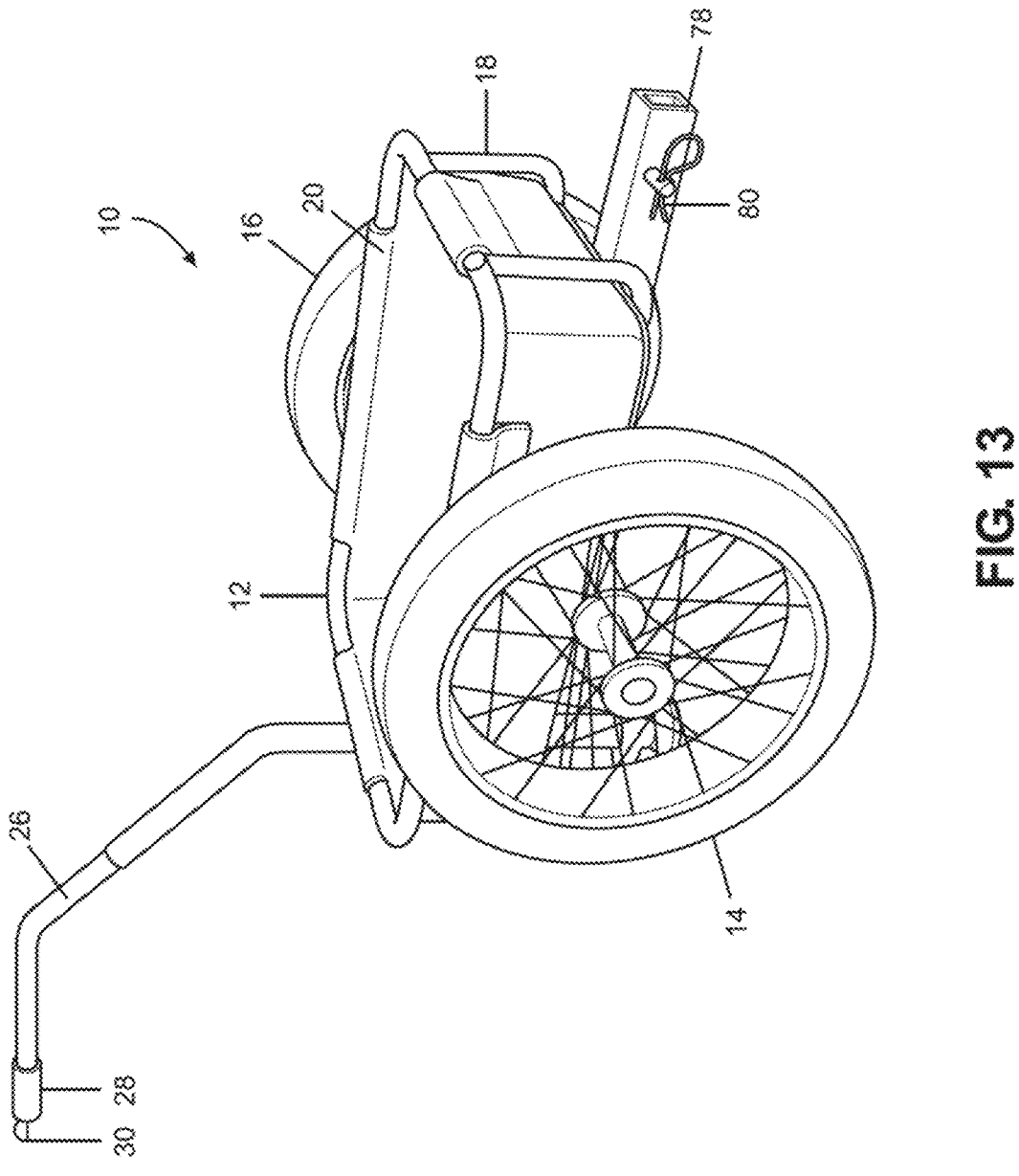
FIG. 13 is a further perspective view of the convertible, all-terrain gear cart of FIG. 12.

In certain embodiments, as FIGS. 12 and 13 show, the retaining post 78 can terminate in a squared end portion. Alternatively, as FIGS. 16A and 16B illustrate, the distal end of the first sleeve 84 of the retaining post 78 can be mitered. For instance, the distal end of the first sleeve 84 of the retaining post 78 can be mitered to have the lower portion of the first sleeve 84 extend distally beyond the upper portion of the first sleeve 84 of the retaining post 78. In such embodiments, the distally projecting lower portion of the first sleeve 84 of the retaining post effectively forms a shelf 82. The retaining post 78 traverses from the distal end of the first sleeve 84, which can be extended to project beyond the second end of the cargo bin 12, to a proximal end of the second sleeve 86 adjacent to the first end of the cargo bin 12. The first sleeve 84 of the retaining post 78 has an aperture that extends horizontally therethrough adjacent to but spaced from the distal end of the first sleeve 84, and a locking pin 80 can be selectively disposed through the apertures in the first sleeve 84 and the trailer hitch receiver 202 of the vehicle 200 to lock the retaining post 78 and the gear cart 10 in general in place relative to the vehicle 200.

With the convertible, all-terrain gear cart 10 so constructed, the gear cart 10 can be readily converted between modes of manual propulsion, trailering, and support by a motor vehicle. For instance, the gear cart 10 can be pushed or pulled by hand over widely varied terrain by gripping the handle 28 of the control arm 26. Trailering behind a bicycle 300 or other trailering vehicle 300 can be accomplished by engaging the trailer hitch connector 30 at the distal end of the control arm 26 with the trailer hitch connector 38 fixed to the bicycle 300. Alternatively, the gear cart 10 and any retained cargo can be transported by motor vehicle 200 by reception of the distal end of the first sleeve of the retaining post 78 into the trailer hitch receiver 202 of the motor vehicle 200.

Figures 15A, 15B, 15C:
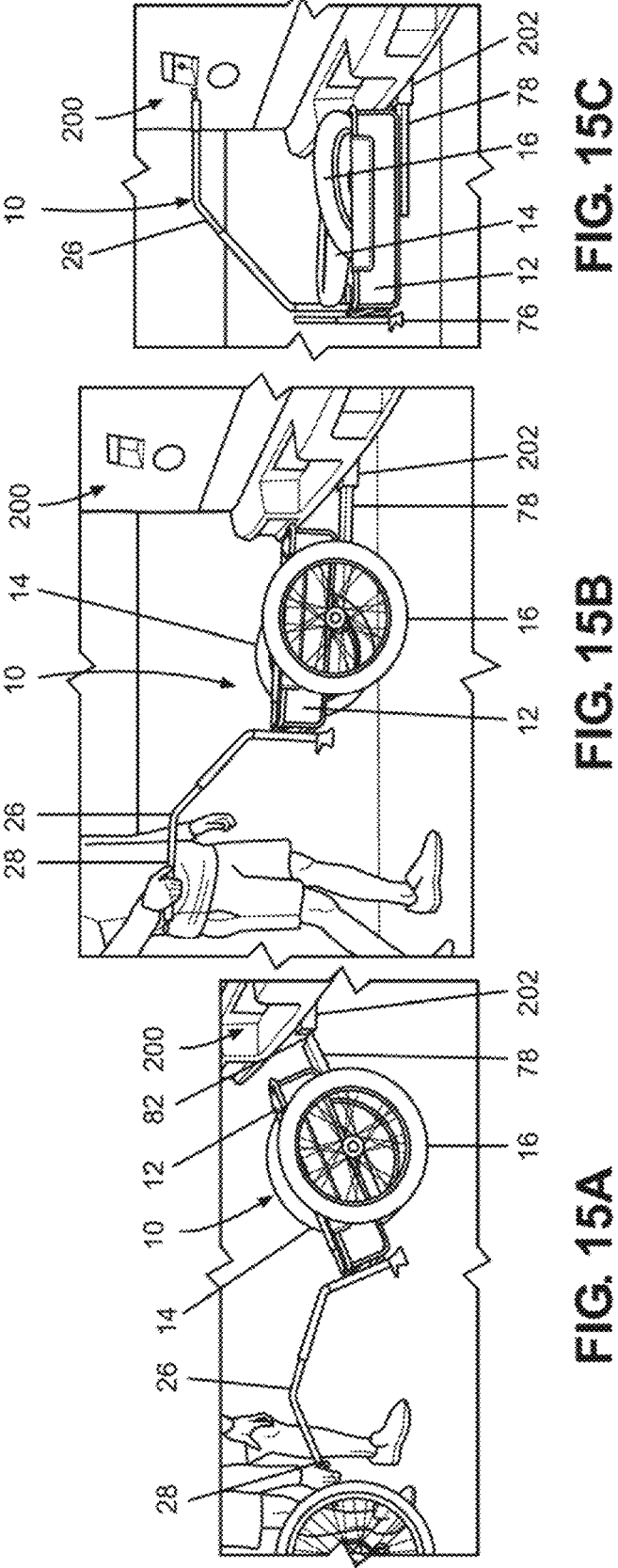
FIGS. 15A, 15B, and 15C are progressive perspective views of the engagement of the convertible, all-terrain gear cart of FIG. 12 with a motor vehicle.

The all-terrain gear cart 10 can be converted from its manual propulsion mode as in FIG. 15A to being supported by a motor vehicle 200 with a trailer hitch receiver 202 as shown in FIG. 15C. In the manual propulsion mode of FIG. 15A, the control arm 26 is disposed in a use orientation extending longitudinally from the cargo bin 12. With the control arm 26 in the use orientation and with the all-terrain wheels 14 and 16 coaxially disposed at a mid-portion of the cargo bin 12, the control arm 26 and the cargo bin 12 can be caused to pivot about the wheels 14 and 16 by pushing the control arm 26 downwardly, which causes the first end of the cargo bin 12 to move downwardly while the second end of the cargo bin 12 and the distal end of the retaining post 78 pivot upwardly. The distally projecting shelf 82 of the mitered end of the retaining post 78, or the square end of the retaining post 78 where the post 78 is not mitered, can then be rested atop the lower portion of the trailer hitch receiver 202 of the vehicle 200. With the retaining post 78 so disposed, the mechanical advantage of the extending control arm 26 can be exploited as in FIG. 15B to lever the gear cart 10 upwardly by lifting the control arm 26 by the handle 28 and using the trailer hitch receiver 202 as a fulcrum. The gear cart 10 can be pivoted until the retaining post 78 is in longitudinal alignment with the trailer hitch receiver 202. Particularly where the end of the retaining post 78 is mitered, even excess pivoting beyond that longitudinal alignment will not tend to disengage the distally projecting shelf 82 from the trailer hitch receiver 202.

With the retaining post 78 aligned with the trailer hitch receiver 202, the gear cart 10 can be slid toward the vehicle to cause the retaining post 78 to be received into the trailer hitch receiver 202 until the apertures of the retaining post 78 and the trailer hitch receiver 202 are aligned. Then, the pin 80 can be inserted through the apertures to lock the retaining post 78 and the gear cart 10 in a position stably supported by the vehicle 200. With the gear cart 10 thus fixed in place, the control arm 26 can be pivoted 180 degrees and potentially locked in the storage position of FIG. 15C where the central and distal segments of the control arm 26 overlie the cargo bin 12 of the gear cart 10. The all-terrain wheels 14 and 16 can be readily removed from the cargo bin 12 where desirable, such as by pressing on release buttons or otherwise.

The gear cart 10 can be disengaged from the motor vehicle 200 by reversing the foregoing steps. More particularly, the control arm 26 can be pivoted 180 degrees to the use position of FIG. 15B, and the wheels 14 and 16 can be reattached, if necessary. With the locking pin 80 removed, the gear cart 10 can be slid away from the vehicle 200, such as until the distally extending shelf 82 overlies the distal end of the trailer hitch receiver 202 where the retaining post 78 has a mitered end portion such that the user has the opportunity to perceive the presence of the distal end of the first sleeve of the retaining post 78 before it is entirely removed from the trailer hitch receiver 202. The gear cart 10 can then be pivoted downwardly, again using the trailer hitch receiver 202 as a fulcrum, until the wheels 14 and 16 safely rest on the ground surface. The retaining post 78 can then be fully disengaged from the trailer hitch receiver 202, and the gear cart 10 can be manually propelled by gripping the handle 28 of the control arm 26 or attached for trailering relative to a bicycle or other trailering vehicle 300. Alternatively, the gear cart 10 can simply be supported in a substantially upright position by adjusting the support leg 32 to its extended position.

Figure 17:
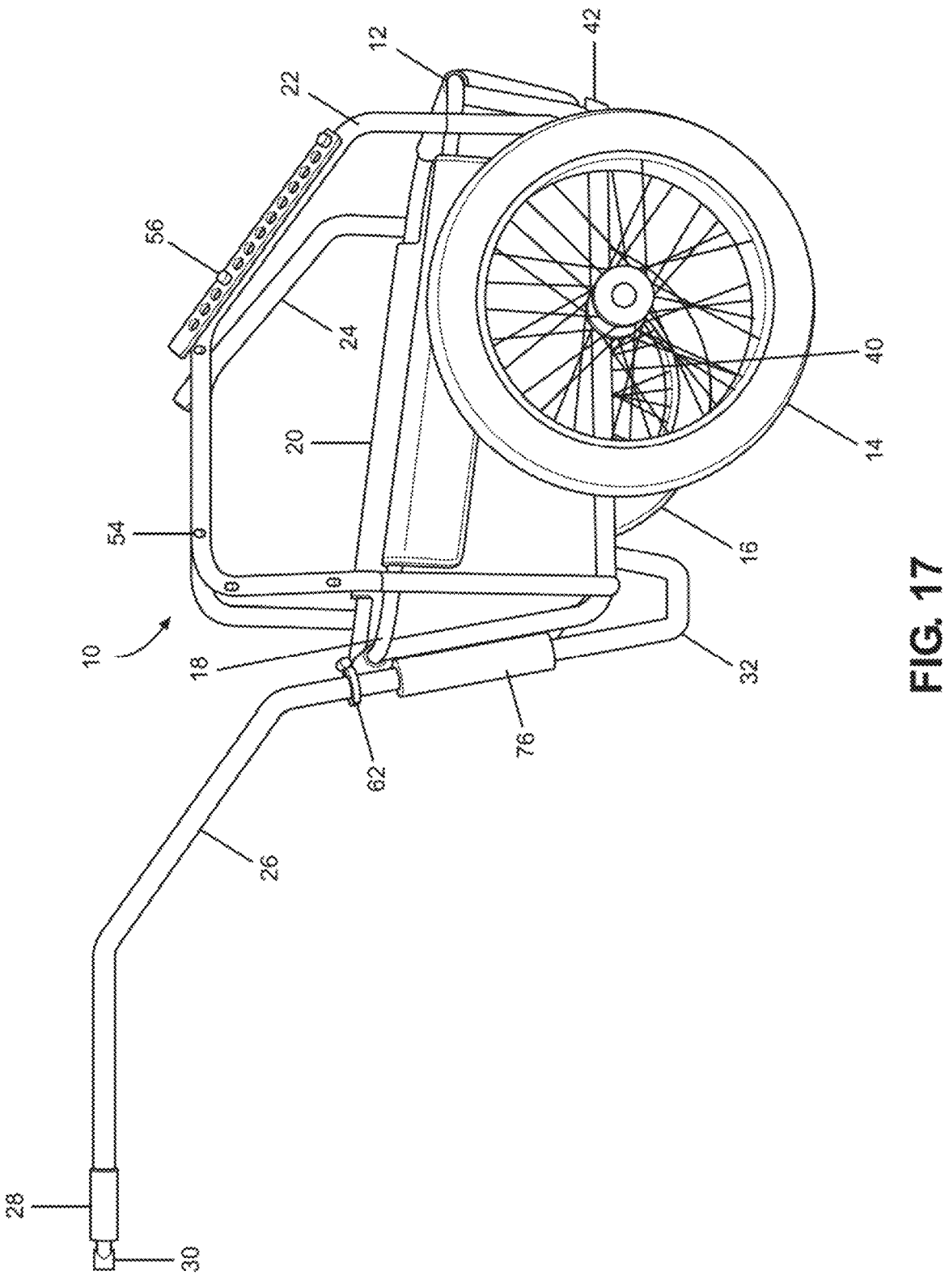
FIG. 17 is a perspective view of a further embodiment of the convertible, all-terrain gear cart of the present invention.
Figure 18:
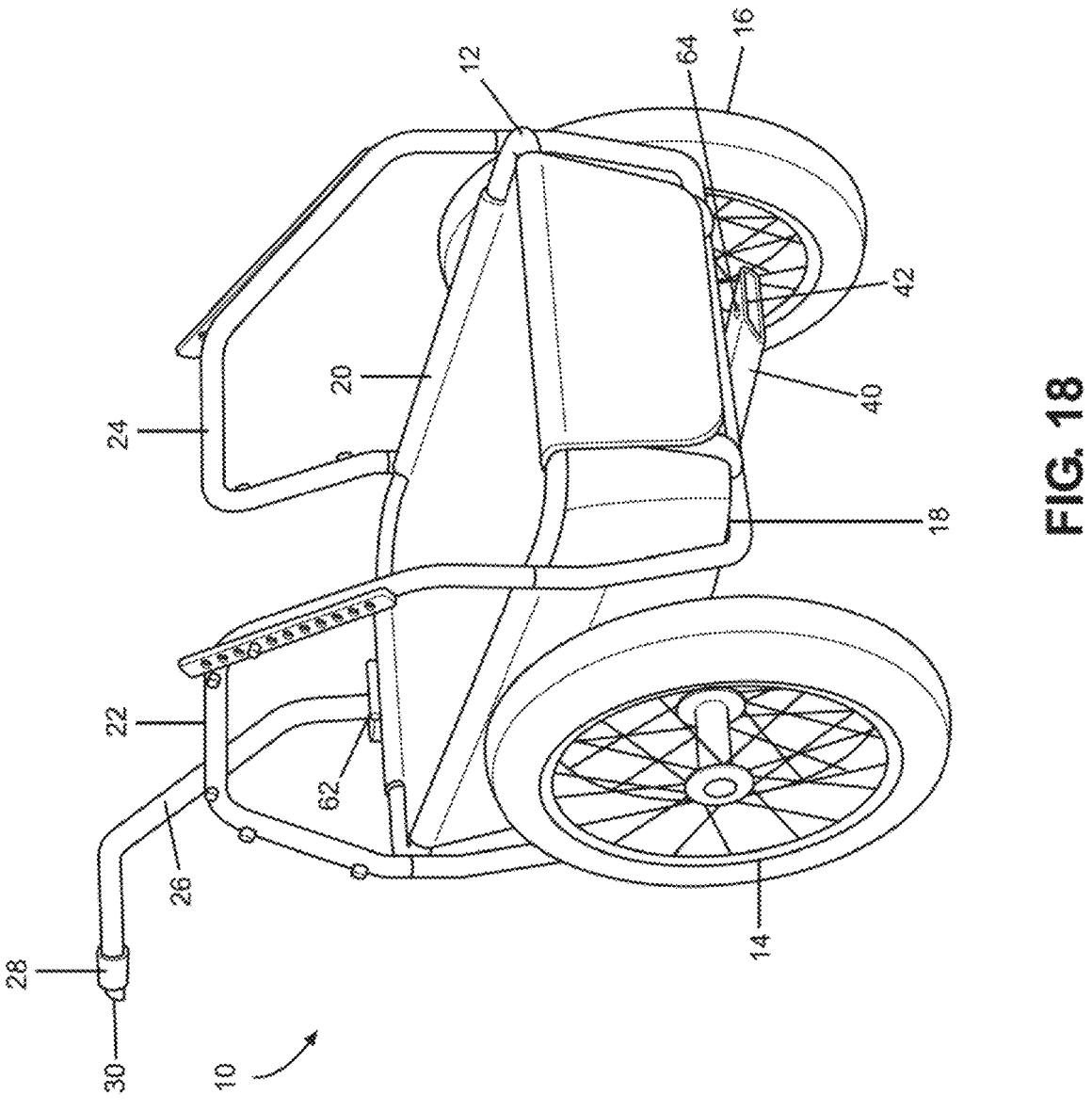
FIG. 18 is an alternative perspective view of the convertible, all-terrain gear cart of FIG. 17.

A further embodiment of the convertible, all-terrain gear cart according to the present invention is again indicated generally at 10 in FIGS. 17 and 18. The gear cart 10 is again founded on a cargo bin 12 with a first end, a second end, a first side, and a second side. An inner cargo storage volume of the cargo bin 12 is defined by a cargo cage 18. The inner cargo storage volume is rectangular in lateral cross section to have a length, a width, and a depth, and the cargo cage 18 again has an upper rectangular frame portion, a lower rectangular frame portion, first and second spaced apart U-shaped longitudinal frame portions, and first and second spaced apart U-shaped lateral frame portions with each of the frame portions again formed by one or more segments of rigid tubing, such as metal tubing. The frame portions are fixed together, such as by welding, by mechanical fasteners, by integral formation, or by any other effective method or combination thereof, to form the cargo cage 18. The tip segments of the upturned first and second legs of each longitudinal frame portion are again fixed to laterally communicating segments of the upper rectangular frame portion while the tip segments of the upturned first and second legs of each lateral frame portion are exposed and open and are fixed laterally outboard of longitudinally communicating segments of the upper rectangular frame portion.

As in earlier-shown embodiments, a cargo liner 20 is received and retained by the cargo cage 18 with the cargo liner 20 substantially corresponding to the shape and size of the interior space bounded by the cargo cage 18. Flap portions of the cargo liner 20 overlie the lateral and longitudinal segments of the upper frame portion of the cargo cage 18, and a bottom of the cargo liner 20 is supported by the lower rectangular frame portion and the central segments of the U-shaped lateral and longitudinal frame portions of the cargo cage 18.

A control arm 26 with a handle 28 is again pivotally coupled to the first end of the cargo bin 12 by a control arm receiver tube 76, and a slot receiver 40 is disposed to project from below the second end of the cargo bin 12. Both the control arm 26 and the receiver 40 are disposed in alignment with a longitudinal centerline of the cargo bin 12 and the convertible, all-terrain gear cart 10 in general. First and second accessory attachment and retention structures, which in this embodiment again comprise cargo retention and roll bars 22 and 24 but could well comprise other accessory attachment and retention structures, project upwardly from the first and second sides of the cargo bin 12. The gear cart 10 is supported for manual propulsion or trailering by detachable first and second all-terrain wheels 14 and 16 that are rotatably retained at a mid-portion of the cargo bin 12 with aligned, lateral axes of rotation orthogonal to the longitudinal centerline of the gear cart 10. In the present embodiment, a fixed support leg 32 is formed by a U-shaped reverse bent lower portion of the control arm receiver tube 76. The support leg 32 is calibrated to be tall enough to cooperate with the wheels 14 and 16 to provide three-point support to the gear cart 10 when needed but short enough to permit the gear cart 10 to be trailered and maneuvered manually without obstruction.

In the present embodiment, the cargo bin 12 and the cargo cage 18 defining it have an upper periphery that extends beyond the peripheries of the all-terrain wheels 14 and 16. With that, gear can be disposed on top of or extending beyond the sides of the cargo bin 12 without being impacted by the wheels 14 and 16. The cargo bin 12 thus further enables the transport of, by way of example and not limitation, flat and bulky articles resting atop or otherwise overlying the edges of the cargo bin 12. Also as shown in this embodiment, the cargo cage 18 and the cargo bin 12 can have a tapered height so that the cargo bin 12 and the cargo cage 18 pursue a truncated wedge shape here with the taller end of the wedge shape being adjacent to the control arm 26 and the shorter end of the wedge shape being adjacent to the second end of the cargo bin 12. Still further, the cargo cage 18 and the cargo bin 12 have outwardly angled walls to the ends and sides thereof.

The first and second cargo retention and roll bars 22 and 24 or other accessory attachment and retention structures 22 and 24 are again removably and replaceably coupled to the cargo bin 12 with tip segments sized and spaced to be matingly engaged, whether to receive or to be received by the tip segments of the upturned first and second legs of the lateral frame portions of the cargo cage 18. The first and second legs of the roll bars 22 and 24 again have aligned lateral bends therein so that, when the roll bars 22 and 24 are engaged with the cargo cage 18, the roll bars 22 and 24 angle inwardly toward the longitudinal centerline of the gear cart 10. It will be understood that the cargo bin 12 could have other tip segments or structures for engaging and retaining the accessory attachment and retention structures 22 and 24. The tip segments of the cargo cage 18 lateral frame portions may be efficiently employed, but other structures would be readily within the scope of the invention except as the claims might expressly exclude. Retaining members 54 are spaced along the cargo retention and roll bars 22 and 24, and plural retaining straps 56 can thus engage the roll bars 22 and 24 and the cargo bin 12 in general to secure articles in relation to the gear cart 10.

The control arm 26 again has a proximal segment retained by the cargo bin 12, a central segment disposed at a non-zero angle relative to the proximal segment, and a distal segment disposed at a non-zero angle relative to the central segment. Here, however, with the first end wall of the cargo bin 12 angled outwardly at a given angle, the proximal segment of the cargo bin 12 is likewise pivotally retained at that same angle by the similarly-angled control arm receiver tube 76. The distal segment of the control arm 26 is crafted to be in a plane generally parallel to a plan of the bottom of the cargo bin 12 and at an angle greater than 90 degrees relative to the proximal segment of the control arm 26. With this, the distal segment pursues a horizontal disposition when the cargo bin 12 is in a position with the bottom of the cargo bin 12 in a horizontal disposition and vice versa. The distal segment of the control arm 26 again comprises a handle portion 28 and a trailer hitch connector 30, which can be of any effective type. The control arm 26 is pivotable and adjustable in height in relation to the control arm receiver tube 76 and in relation to the cargo bin 12 in general. The control arm 26 can be selectively locked against pivoting and, additionally or alternatively, height adjustment by a locking mechanism 62. The control arm 26 can thus again be pivoted 180 degrees from the use position illustrated to a storage position, and the control arm 26 can be selectively detached from the receiver tube 76 and the cargo bin 12.

In the present embodiment, the slot receiver 40, which again comprises a rigid sleeve, is disposed to be accessible from below the second end of the cargo bin 12. The slot receiver 40 may, but need not necessarily, extend beyond the second end of the cargo bin 12. The distal end of the slot receiver 40 is again mitered to have a recessed lower portion and an overhanging upper portion that projects distally beyond the recessed lower portion to form a distally projecting shelf 42. Apart from that distal end, the slot receiver 40 has a cross section that has a greater width dimension than its height dimension. By way of non-limiting example, that cross section could be generally rectangular, or it could be oblong or another shape. The portion of the slot receiver 40 proximal to the mitered distal end can again form a narrow slot opening, and an aperture 64 extends vertically therethrough adjacent to but spaced from the distal end of the slot receiver 40 so that a locking pin (not shown in this embodiment) can be selectively disposed through the aperture 64. The slot receiver 40 so constructed can again cooperate with a trailer hitch adapter 46 as in FIG. 3 to establish a reliable, stable supporting engagement between the gear cart 10 and a trailer hitch receiver 202 of a motor vehicle 200. The convertible, all-terrain gear cart 10 can thus be readily converted between modes of manual propulsion, trailering, and support by a motor vehicle.

Figure 19:
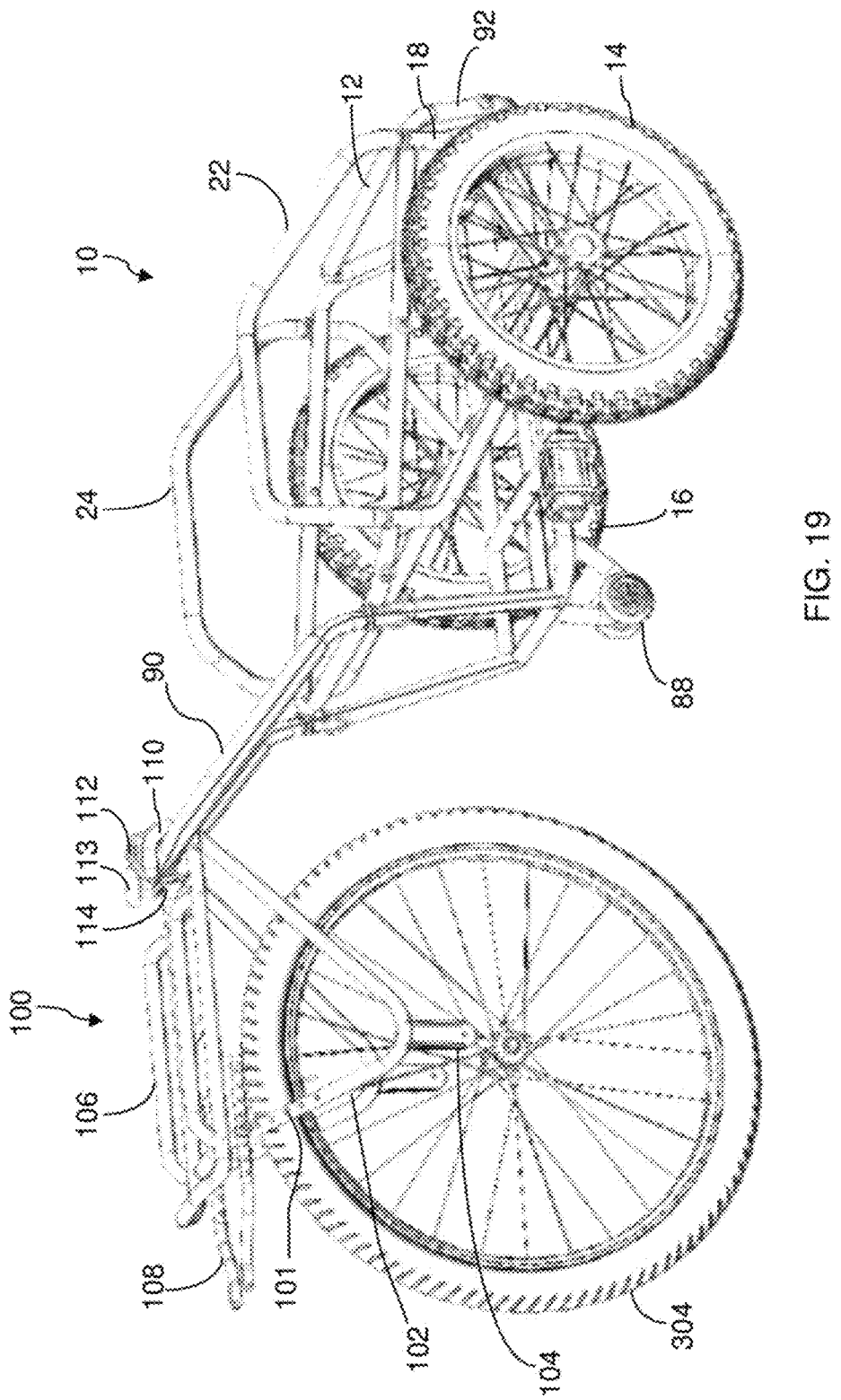
FIG. 19 is a perspective view of another alternative embodiment of the convertible, all-terrain gear cart positioned for towing by a bicycle.

A further embodiment of a convertible, all-terrain gear cart 10 according to the present invention is shown in FIG. 19 where the gear cart 10 is positioned for trailering behind a bicycle, although only the rear wheel 304 of the bicycle is illustrated in that figure. The gear cart 10 is again founded on a cargo bin 12, which is defined by a cargo cage 18, with a first end, a second end, a first side, and a second side. First and second accessory attachment and retention structures in the form of cargo retention and roll bars 22 and 24 project upwardly from the first and second sides of the cargo bin 12. Here, a third wheel assembly 88 is retained to project ventrally from the lower side of the cargo cage 18 in general alignment with the longitudinal centerline of the cargo bin 12. First and second all-terrain wheels 14 and 16 are rotatably retained at a mid-portion of the cargo bin 12 with aligned, lateral axes of rotation that are orthogonal to the longitudinal centerline of the gear cart 10. The all-terrain wheels 14 and 16 are again detachable from the cargo bin 12 as previously disclosed.

The cargo cage 18 of the cargo bin 12 defines an inner cargo storage volume that is generally rectangular in lateral cross section to have a length, a width, and a depth. First and second cargo retention and roll bars 22 and 24 are removably and replaceably coupled to the cargo bin 12. Tip segments of first and second legs of the roll bars 22 and 24 are sized and spaced to be matingly engaged with tip segments of upturned first and second legs of lateral frame portions of the cargo cage 18.

In the present embodiment, a tow and control handle 90 has a proximal portion connected to the cargo cage 18 of the cargo bin 12 and a distal portion for coupling to a towing vehicle, such as a bicycle or other vehicle. The tow and control handle 90 has the general shape of a bow of a yoke such that the tow and control handle 90 has first and second legs with a lateral engaging section therebetween. The ends of the first and second legs are removably fixed in relation to the cargo cage 18 with the lateral engaging section spanning therebetween. The lateral engaging section is disposed centered upon and orthogonal to the longitudinal centerline of the gear cart 10. Together, the lateral engaging section, the first and second legs, and the anterior frame member of the cargo cage 18 form a closed loop.

A towing rack 100 cooperates with the tow and control handle 90 of the gear cart 10 to form a towing system. The towing rack 100 can be affixed to a towing vehicle. The towing vehicle could comprise a manual or electric bicycle, a motorcycle, an all-terrain vehicle, or any other type of vehicle. The towing rack 100 has a main frame 102 formed, in a non-limiting embodiment, from tubular metal. Generally V-shaped portions 101 of the towing rack 100 are disposed in opposition with a tire spacing therebetween, and a support frame 106 fixed to the upper ends of the legs of the V-shaped portions 101. First and second support arms 104 extend from the bases of the V-shaped portions 101 for engaging and being supported, for example, by the axle of the rear wheel 304 of a bicycle to which the towing rack 100 is affixed. First and second adjustment bars 108 are longitudinally disposed with first ends for being affixed to the towing vehicle, such as to the seat post or frame of the bicycle, and body portions with fastening apertures therealong for being selectively engaged with corresponding apertures in the anterior legs of the V-shaped portions 101 of the main frame 102.

Figure 20:
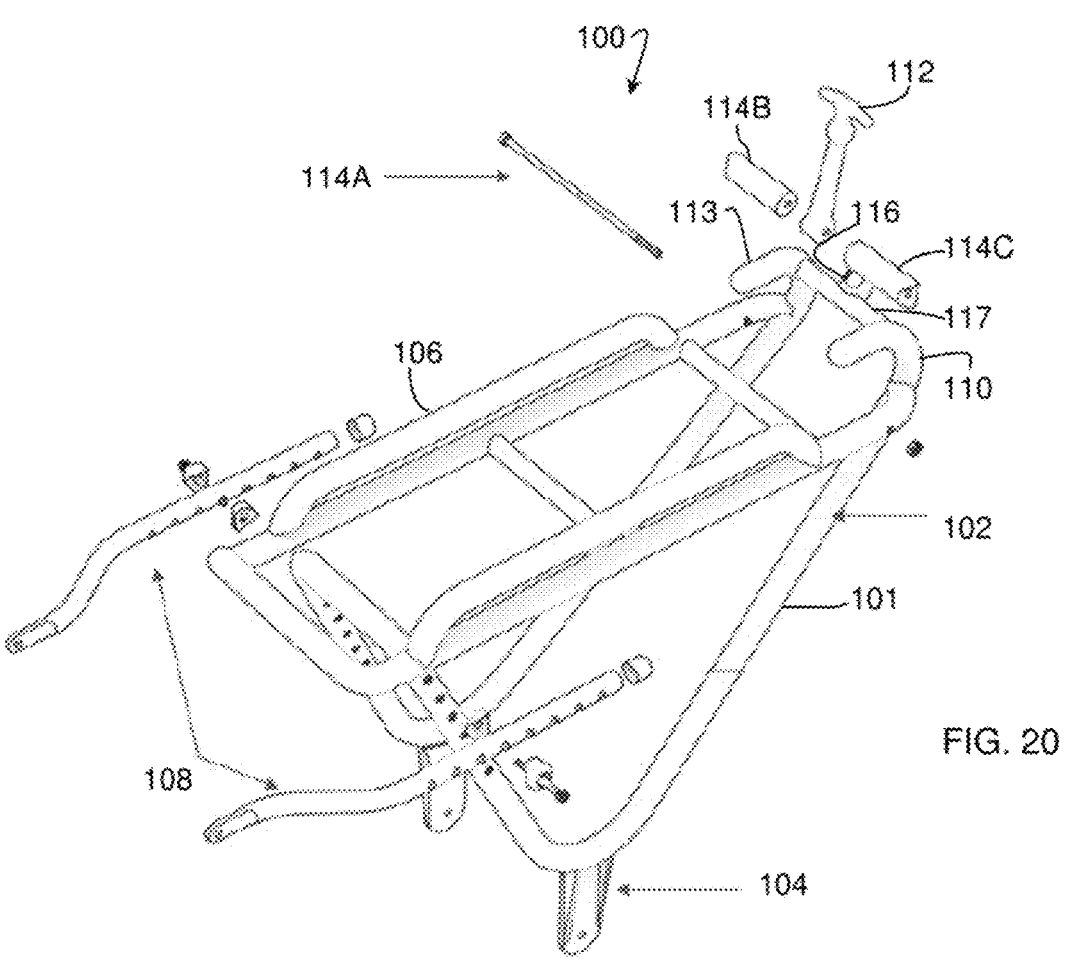
FIG. 20 is a partially exploded perspective view of a towing rack as disclosed herein.
Figure 21:
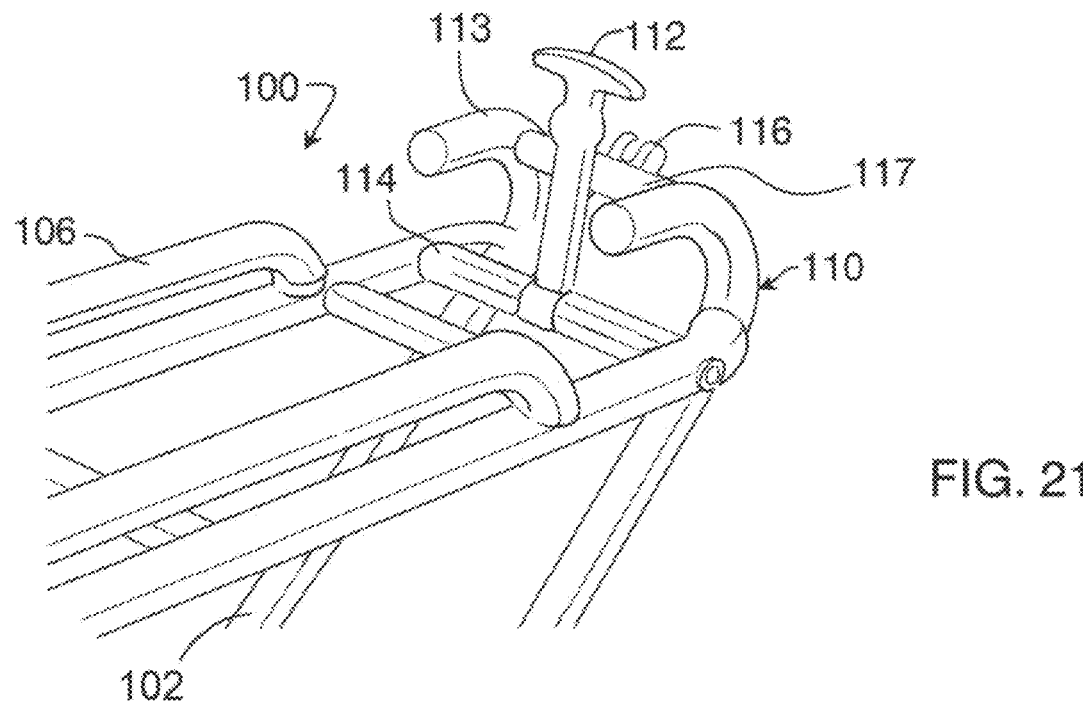
FIG. 21 is a perspective view of the retention portion of the towing rack of FIG. 20.

A reverse hook structure 110 is fixedly retained at the posterior portion of the towing rack 100. As further shown in FIGS. 20 and 21, for example, the reverse hook structure 110 is formed with first and second towing hooks 113 disposed in parallel. The first and second towing hooks 113 have proximal portions that extend from the distal ends of the posterior legs of the V-shaped portions of the main frame 102, and the first and second towing hooks 113 have arcuate body portions that curve to terminate in distal end portions that project anteriorly in parallel. With that, the first and second towing hooks 113 together form a hooking structure into which the lateral engaging section of the tow and control handle 90 can be received and hooked thus to establish a towing relationship between the gear cart 10 and the towing vehicle, whether it be a bicycle or another vehicle.

The lateral engaging section of the tow and control handle 90 can be selectively retained or trapped within the first and second towing hooks 113 of the reverse hook structure 110 by a latch member 112. In the depicted embodiment, the latch member 112 comprises a flexible strap that terminates distally with a retaining formation, which in this example comprises a ball, and a handle portion. The strap could, by way of example and not limitation, comprise a heavy duty strap formed of rubber or another suitably strong and durable material. The latch member 112 is retained at its proximal end by a first retaining structure 114 that spans laterally from the left section to the right section of the main frame 102 with ends fixedly retained thereby. A shown in FIG. 20, for example, the first retaining structure 114 can be formed with a core retaining rod 114A that passes through the left section of the main frame 102, through the proximal end of the latch member 112 disposed centered between the left and right sections of the main frame 102, and through the right section of the main frame 102. Spacers 14B and 14C are retained by the retaining rod 114A interposed between the proximal end of the latch member 112 and the right and left sections of the main frame 102 respectively. Further, a receiving latch 116 is retained by a second retaining structure 117 that comprises a rod that spans laterally from a mid-portion of the first towing hook 113 to a mid-portion of the second towing hook 113. Here, the receiving latch 116 comprises a receiving cup 116 fixed to the second retaining structure 117 for selectively receiving the ball disposed at the distal end of the latch member 112. The receiving cup 116 has a slot anteriorly disposed therein for permitting passage of the strap portion of the latch member 112 when the ball is received in the cup 116.

Under this construction, the convertible, all-terrain gear cart 10 can be rapidly and securely attached to a vehicle for towing without a need for additional components to permit the gear cart 10 to convert from a hand-operated cart to a towed vehicle. To do so, with the retaining formation of the latch member 112 free of the receiving latch 116, the lateral engaging section of the tow and control handle 90 can be caused to be received into the first and second towing hooks 113 of the reverse hook structure 110. Then, the strap portion of the latch member 112 can be caused to pass over the lateral engaging section of the tow and control handle 90, and the ball retaining formation can be inserted into the receiving cup 116. With that, as shown in FIG. 19, the lateral engaging section of the tow and control handle 90 is effectively trapped and retained within the first and second towing hooks 113 with the hooks 113 and the strap portion of the latch member 112 cooperating to define a retention area. Advantageously, the attachment between the gear cart 10 and the towing vehicle is secure yet inherently flexible, permitting universal pivoting of the gear cart 10 relative to the reverse hook structure 110 and the bicycle or other vehicle.

Figure 22:
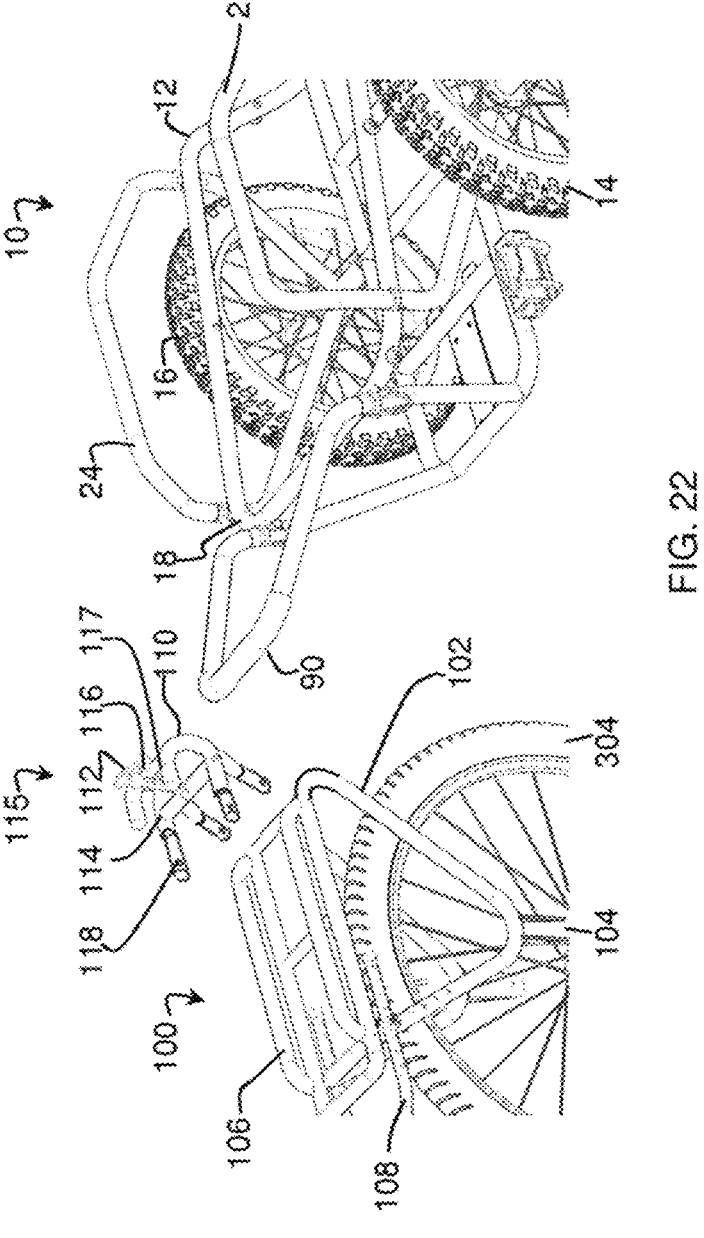
FIG. 22 is a partially exploded perspective view of a towing rack according to the present invention prepared for coupling with a convertible, all-terrain gear cart according to the invention.

Other manifestations of the reverse hook structure 110 are possible and within the scope of the invention. For example, as FIG. 22 shows, embodiments are contemplated wherein the reverse hook structure 110 is formed as a towing adapter 115 for being connected to a rack 100 affixed to a bicycle or other vehicle. The reverse hook structure 110 is again formed with first and second towing hooks 113 disposed in parallel for selectively receiving and retaining the lateral engaging section of the tow and control handle 90 to establish a towing relationship between the gear cart 10 and the towing vehicle. A latch member 112, which again comprises a flexible strap that terminates distally with a retaining formation and a handle portion, has a proximal end retained by a first retaining structure 114 that spans laterally from the left section to the right section of the adapter 115 with ends fixedly retained thereby. A receiving latch 116, which again comprises a receiving cup 116 with a slot anteriorly disposed therein, is retained by a second retaining structure 117 that comprises a rod spanning laterally from a mid-portion of the first towing hook 113 to a mid-portion of the second towing hook 113. The adapter 115 has leg portions 118 that project therefrom for fastening, for instance, to the main frame 102 of a towing rack 100 or another structure. For instance, the depicted embodiment has four leg portions 118 oriented and otherwise positioned for engaging the posterior legs of the V-shaped members 101 of the main frame 102 and for engaging the tubing of the support frame 106 of the towing rack 100. In certain embodiments, for example, the leg portions 118 can be matingly received into the posterior legs of the V-shaped members 101 and into the tubing of the support frame 106, or they could be affixed thereto, such as by mechanical fasteners, welding, or any other method or combination thereof.

Figure 29:
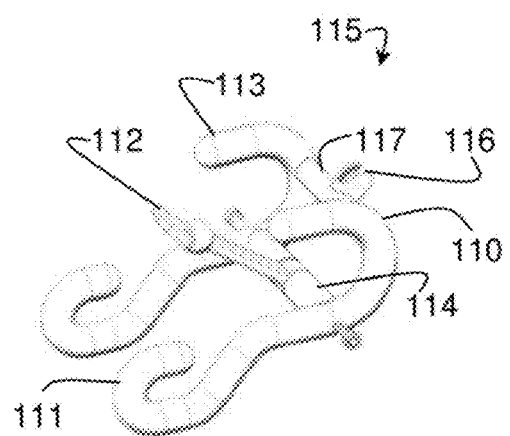
FIG. 29 is a perspective view of an alternative embodiment of a towing adapter as disclosed herein.
Figure 30:
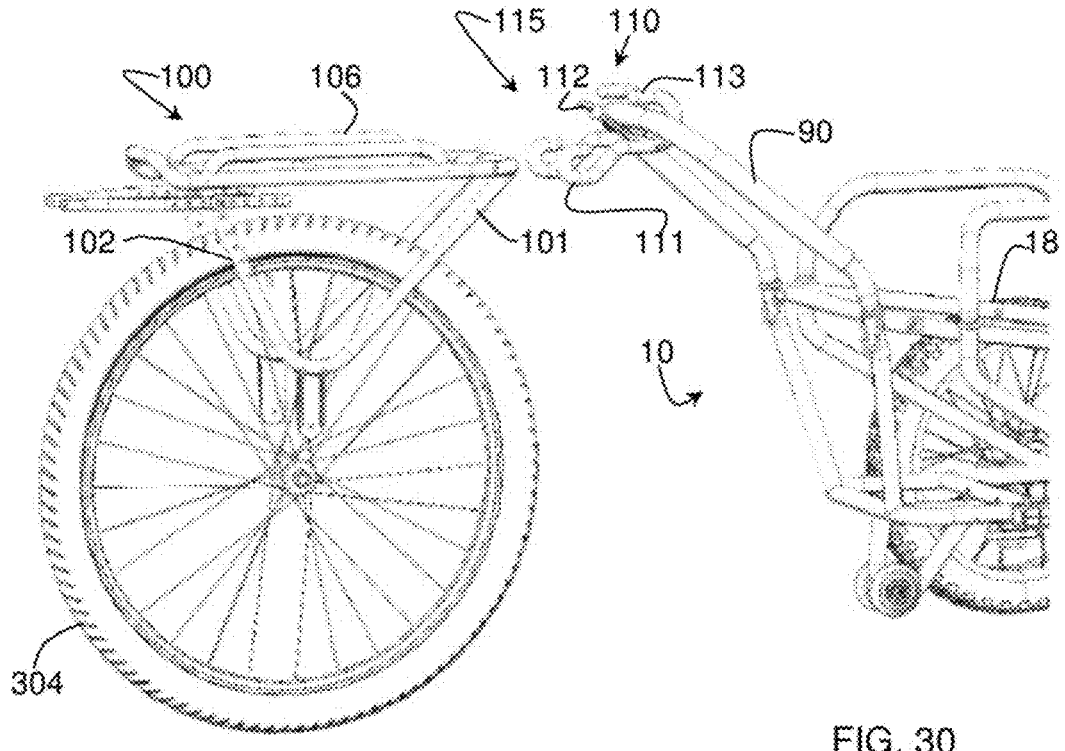
FIG. 30 is a perspective view of the towing adapter of FIG. 29 positioned for coupling a convertible, all-terrain gear cart according to the invention to a bicycle for towing.

FIGS. 29 and 30 show still another embodiment of the towing adapter 115 wherein the adapter 115 is constructed itself to be rapidly hooked onto a towing vehicle, such as to a preexisting rack 100 of a bicycle. In the embodiment of FIGS. 29 and 30, a reverse hook structure 110 is again formed with first and second towing hooks 113 disposed in parallel for selectively receiving and retaining the lateral engaging section of the tow and control handle 90, and a latch member 112, again comprising a flexible strap that terminates distally with a retaining formation and a handle portion, has a proximal end retained by a first retaining structure 114 that spans laterally from the left section to the right section of the adapter 115 with ends fixedly retained thereby. A receiving latch 116, which again comprises a receiving cup 116 with a slot anteriorly disposed therein, is retained by a second retaining structure 117 that comprises a rod spanning laterally from a mid-portion of the first towing hook 113 to a mid-portion of the second towing hook 113. Here, the adapter 115 has first and second anterior hooks 111 disposed in parallel and to an anterior end of the towing adapter 115. The first and second anterior hooks 111 have proximal portions that extend anteriorly and oppositely of the first and second towing hooks 113, and the first and second anterior hooks 111 have arcuate body portions that curve to terminate in distal end portions that project posteriorly in parallel. With that, the first and second anterior hooks 111 together form a hooking structure that can readily be hooked onto a towing vehicle. In the depicted example, the first and second anterior hooks 111 are positioned to be hooked onto the rack 100 of a bicycle. The rack 100 could be a preexisting rack, such as on a typical bicycle or on an ebike, or the rack 100 could be particularly constructed for use hereunder. It is also contemplated that the first and second anterior hooks 111 could be secured in place relative to the rack 100, such as by a retaining latch as disclosed herein or in some other manner.

Figure 23:
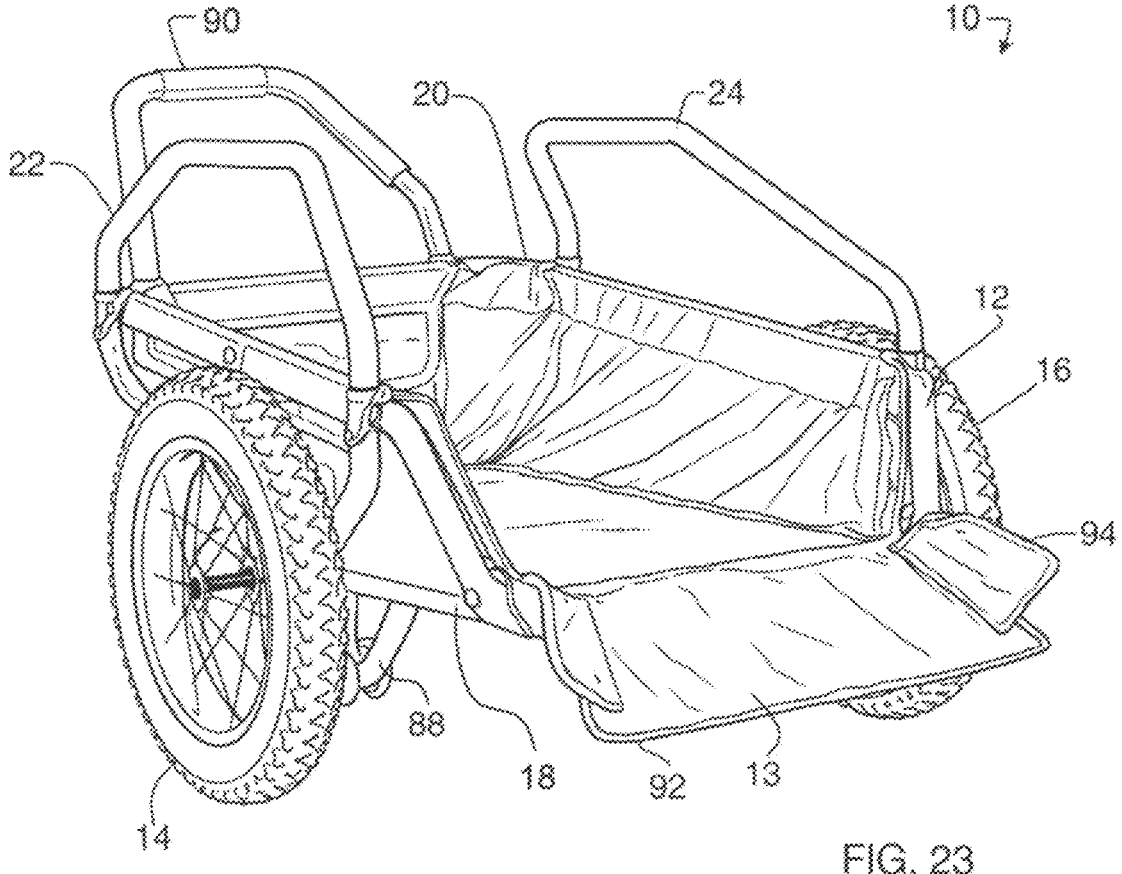
FIG. 23 is a perspective view of an alternative convertible, all-terrain gear cart pursuant to the present invention.
Figures 24A, 24B:
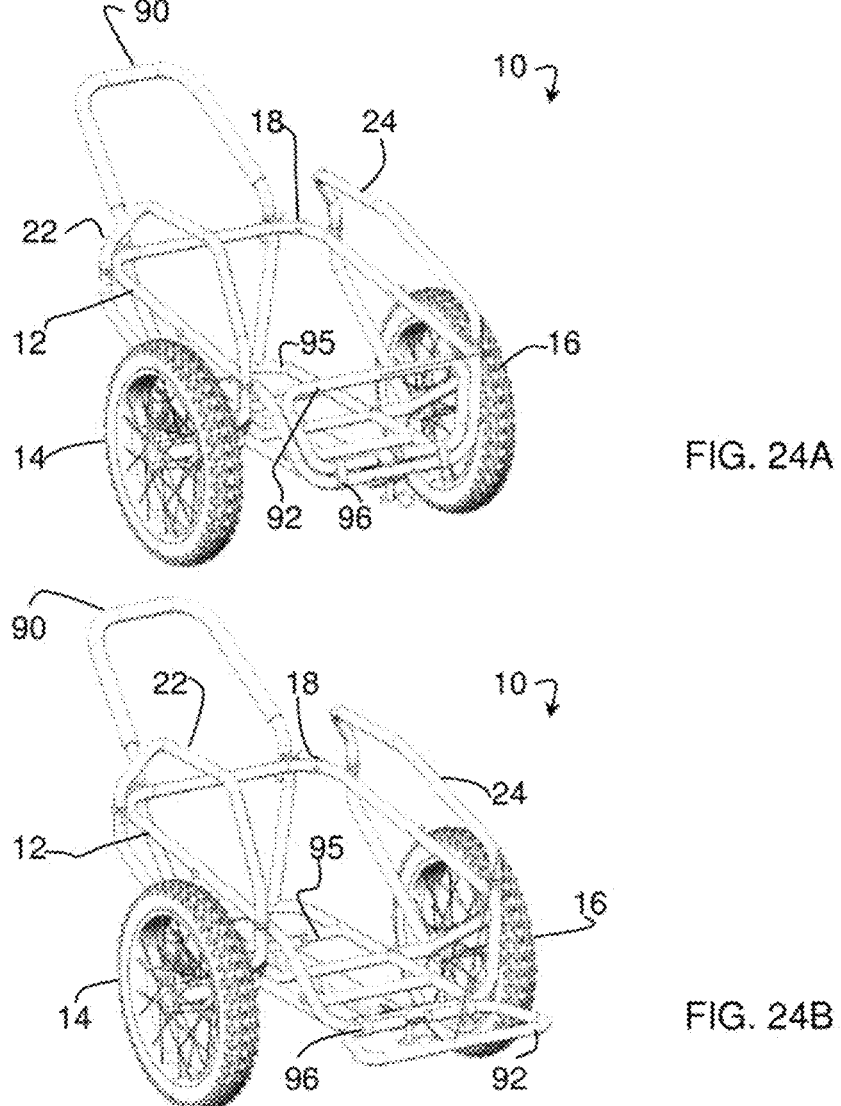
FIGS. 24A and 24B are perspective views of a further embodiment of the convertible, all-terrain gear cart with a pivoting tail gate in closed an open conditions, respectively.

It will again be recognized that there is a need in the art for a gear cart capable of being manually propelled that can provide users with an extendable, expandable cargo support surface. To that end, the inventors have devised of embodiments of the convertible, all-terrain gear cart 10 that can be adjusted in configuration to enable enhanced gear transportation capabilities. One such embodiment is shown in FIGS. 23, 24A, and 24B. The gear cart 10 is again founded on a cargo bin 12 that is defined by a cargo cage 18. The cargo cage 18 has a first or anterior end, a second or posterior end, a first or left side, and a second or right side. First and second cargo retention and roll bars 22 and 24 are fixed to the cargo cage 18 to project upwardly from the first and second sides of the cargo bin 12, and a third wheel assembly 88 is retained to project ventrally from the lower side of the cargo cage 18 in general alignment with the longitudinal centerline of the cargo bin 12. First and second detachable all-terrain wheels 14 and 16 are rotatably retained at a mid-portion of the cargo bin 12. A tow and control handle 90 has a proximal portion connected to the cargo cage 18 and a distal portion for coupling to a towing vehicle. The tow and control handle 90 again has first and second legs with a lateral engaging section therebetween.

The cargo cage 18 is lined with a cargo liner 20, and the cargo cage 18 and liner 20 cooperate to define an inner cargo storage volume that is generally rectangular in lateral cross section to have a length, a width, and a depth. In the present embodiment, however, the cargo cage 18 and the cargo liner 20 further cooperate to provide a structure with a rear tailgate 92 that can be selectively opened as is shown in FIG. 23 or closed. To facilitate that, as is best shown in FIGS. 24A and 24B, the cargo cage 18 has a rear tailgate 92 that is hingedly coupled to the base of the framework of the cargo cage 18. Like the remainder of the cargo cage 18, the rear tailgate can be formed from a rigid material, such as tubular metal or plastic or some other suitable material. The pivoting of the rear tailgate 92 can be limited to permitting the tailgate 92 to achieve a position coplanar with or in a plane parallel to the plane of the main cargo bed 95 of the cargo cage 18.

The cargo liner 20 again can be formed from any suitable material, such as canvas or another fabric or of multiple layers of material. The cargo liner 20 has a flap section 93 sized and positioned in correspondence to the rear tailgate 92 of the cargo cage 18. The flap section 93 of the cargo liner 20 has side flaps 94 for meeting or overlapping with the portions of the cargo liner 20 lining the left and right sides of the cargo cage 18, and the side flaps 94 and the adjacent portions of the cargo liner 20 can include selective fastening mechanisms, such as zippers, hook and loop material, or any other mechanism or combination thereof for engaging the side flaps 94 with the adjacent portions of the cargo liner 20.

Under the construction of FIGS. 23, 24A, and 24B, therefore, the gear cart 10 can provide a laterally-enclosed inner cargo storage volume defined by the cargo cage 18 and the cargo liner 20 while the rear tailgate 92 and the corresponding flap section 93 of the cargo liner 20 are in a closed condition. Furthermore, when desired, the rear tailgate 92 and the flap section 93 of the cargo liner 20 can be pivoted to the open condition of FIGS. 23 and 24B, such as to facilitate a dumping or other removal of cargo or to enable the transport of larger loads.

Figure 25A:
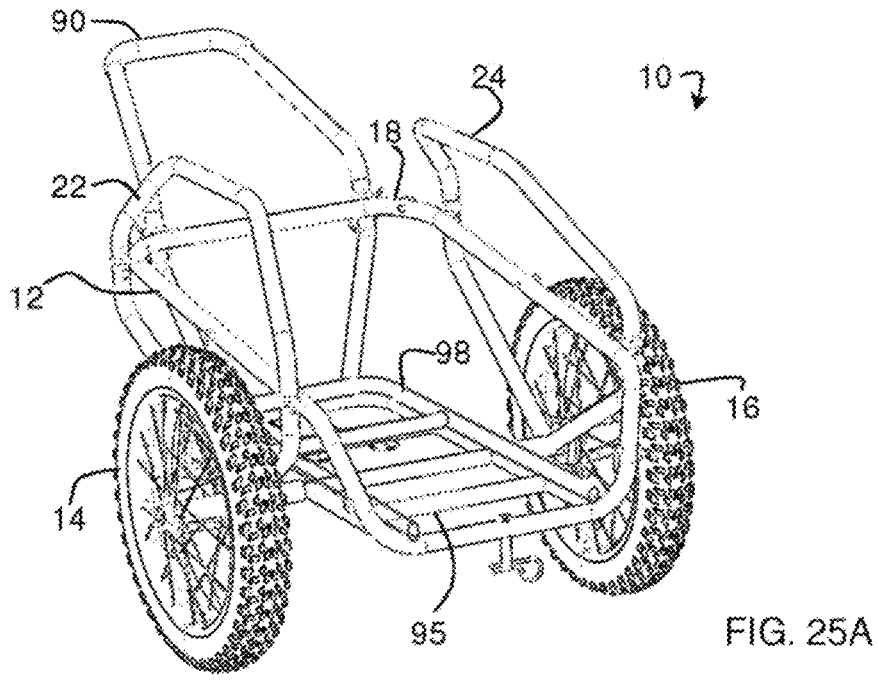
FIGS. 25A and 25B are perspective views of another embodiment of the convertible, all-terrain gear cart with a pivoting payload extension rack in retracted and extended positions, respectively.
Figure 25B:
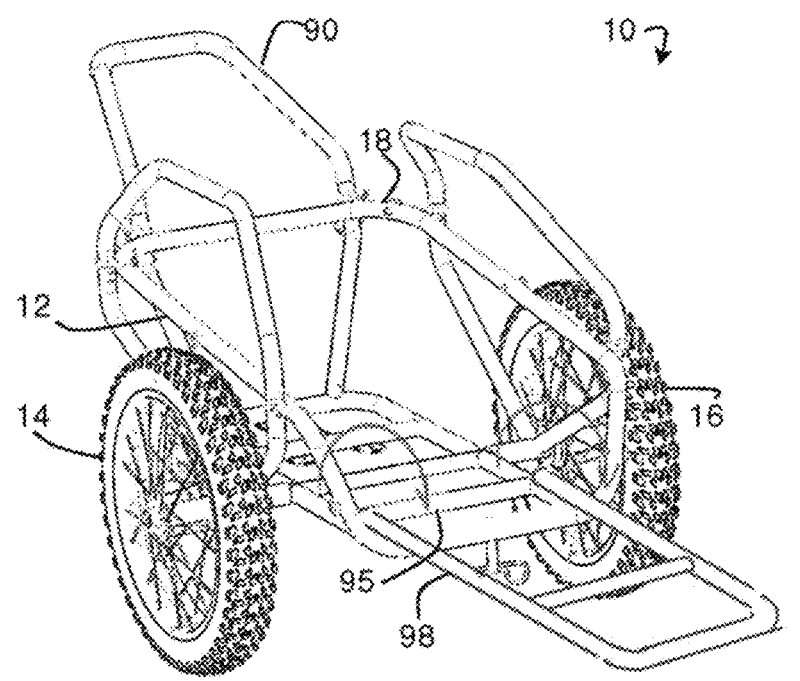

Other constructions are contemplated wherein the payload carrying characteristics of the convertible, all-terrain gear cart 10 are capable of being adjusted. For instance, as in FIGS. 25A and 25B, a gear cart 10 is depicted that is constructed largely as described previously but with a cargo cage 18 having a cargo bed extension structure 98. The cargo bed extension structure 98 is operable to selectively extend the longitudinal size of the cargo bed provided by the gear cart 10 beyond the footprint of the main cargo bed 95. In the embodiment of FIGS. 25A and 25B, the cargo bed extension structure 98 is pivotally coupled to the main frame of the cargo cage 18. With that, the cargo bed extension structure 98 can be disposed in the storage configuration of FIG. 25A where the cargo bed extension structure 98 rests atop the main cargo bed 95 of the cargo cage 18. Alternatively, where a larger cargo bed is desired, the cargo bed extension structure 98 can be pivoted to the extended configuration of FIG. 25B thereby to enable to transport of additional or elongate gear.

Figure 26A:
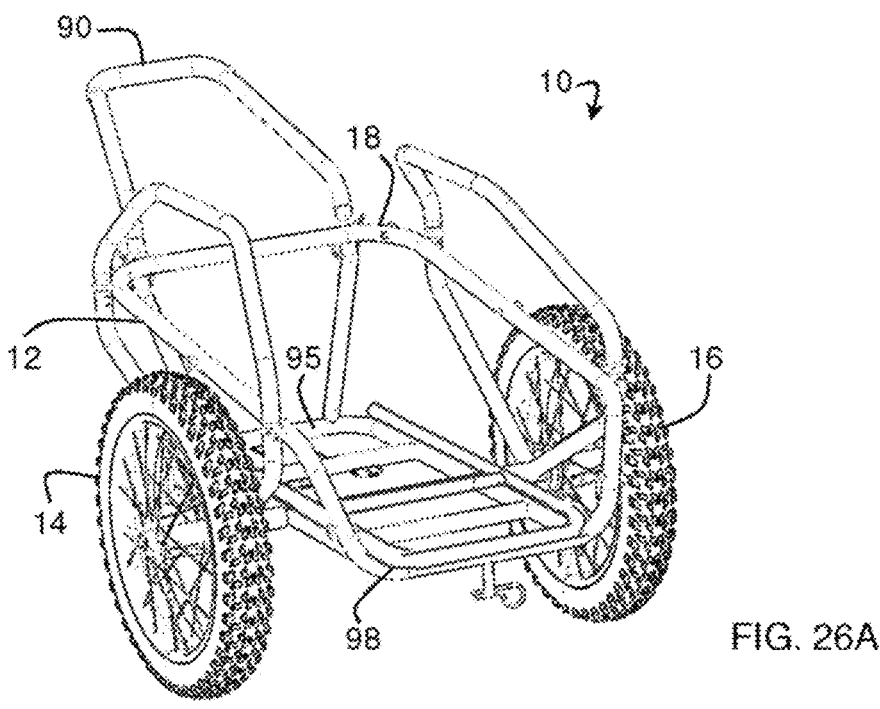
FIGS. 26A and 26B are perspective views of another embodiment of the convertible, all-terrain gear cart with an extendable payload extension rack in retracted and extended positions, respectively.
Figure 26B:
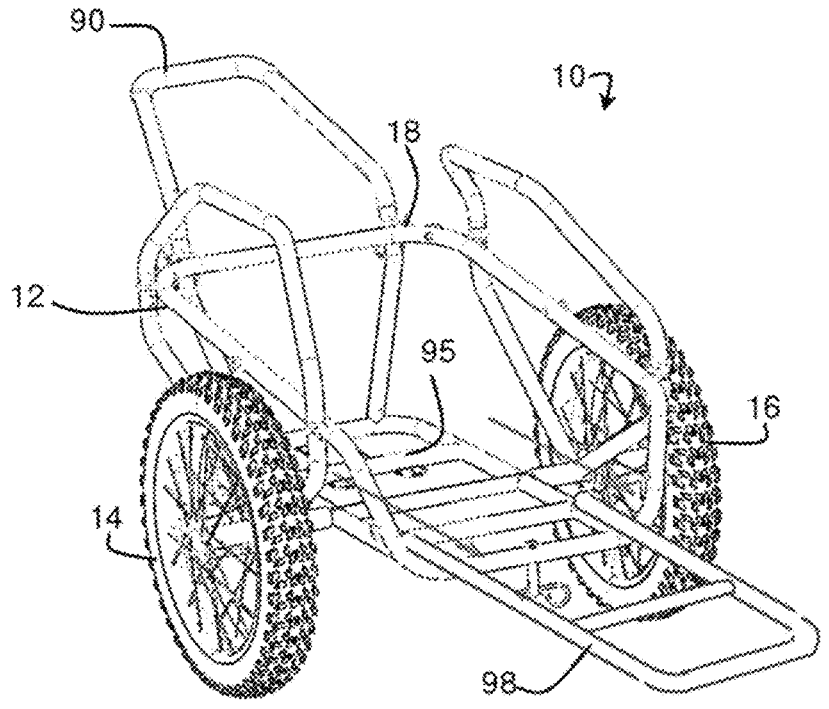

As shown in FIGS. 26A and 26B, other manifestations of the extendable cargo bed are within the scope of the invention. There, a cargo bed extension structure 98 again has a retracted position wherein the cargo bed extension structure 98 rests atop the main cargo bed 95 and an extended position wherein the cargo bed extension structure 98 is extended to increase the effective length of the cargo bed. In the depicted embodiment, however, the cargo bed extension structure 98 is retained to slide longitudinally between the extended and retracted positions, such as in a telescopic fashion.

Figure 27A:
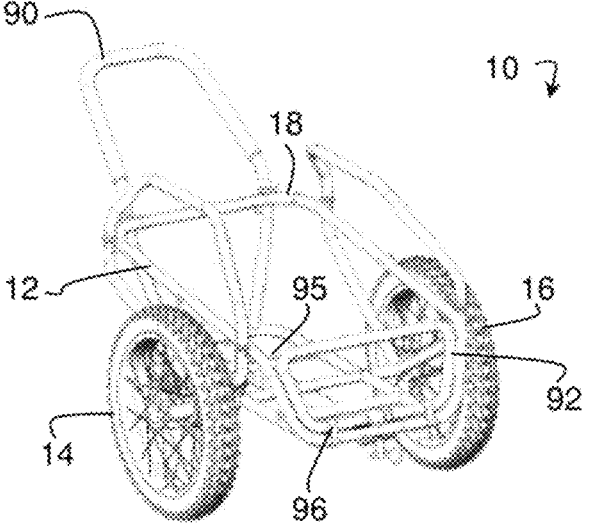
FIGS. 27A and 27B are perspective views of a further embodiment of the convertible, all-terrain gear cart with an extendable payload extension rack in retracted and extended positions and with a pivoting tail gate in closed and open configurations, respectively.
Figure 27B:
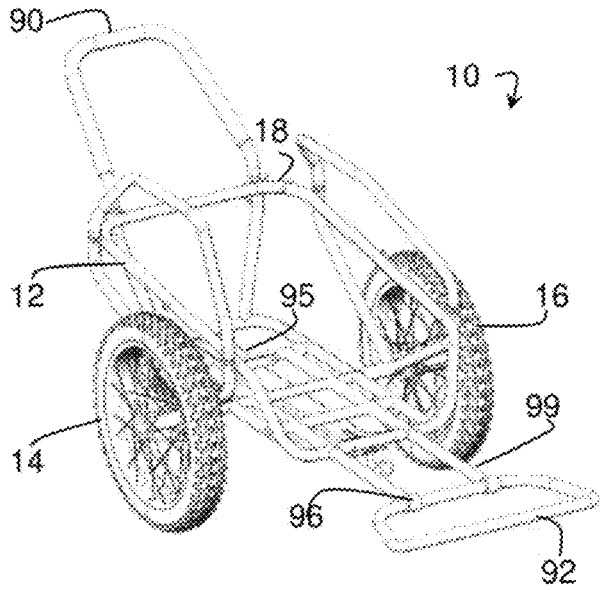

FIGS. 27A and 27B depict still another embodiment of the convertible, all-terrain gear cart 10 wherein the cargo bed extension structure 98 is retained to be adjustable between the retracted position of FIG. 27A and the extended position of FIG. 27B. Here, however, a rear tailgate 92 is pivotally retained by the distal end of the cargo bed extension structure 98 to extend and retract therewith. With that, not only can the cargo bed extension structure 98 be extended and retracted as illustrated, but also the rear tailgate 92 can be selectively pivoted either to provide an upstanding tailgate or to extend the foot print of the cargo bed still further.

A further construction of the convertible, all-terrain gear cart 10 is shown in FIGS. 28A through 28D. There, the gear cart 10 has a use mode wherein the cargo frame 18 is fully expanded as in FIG. 28A and a further use mode as in FIG. 28C wherein the cargo frame 18 is partially collapsed while the anterior cargo frame section 18C and the tow and control handle 90 remain extended and positioned for use in towing and controlling the gear cart 10. To permit this, the cargo frame 18 has a left cargo frame section 18A, a right cargo frame section 18B, an anterior cargo frame section 18C, and a bottom frame section 18D that forms the main cargo bed 95 of the gear cart 10. The left, right, and anterior cargo frame sections 18A, 18B, and 18C are independently pivotable in relation to the bottom frame section 18D.

Figures 28A, 28B, 28C, 28D:
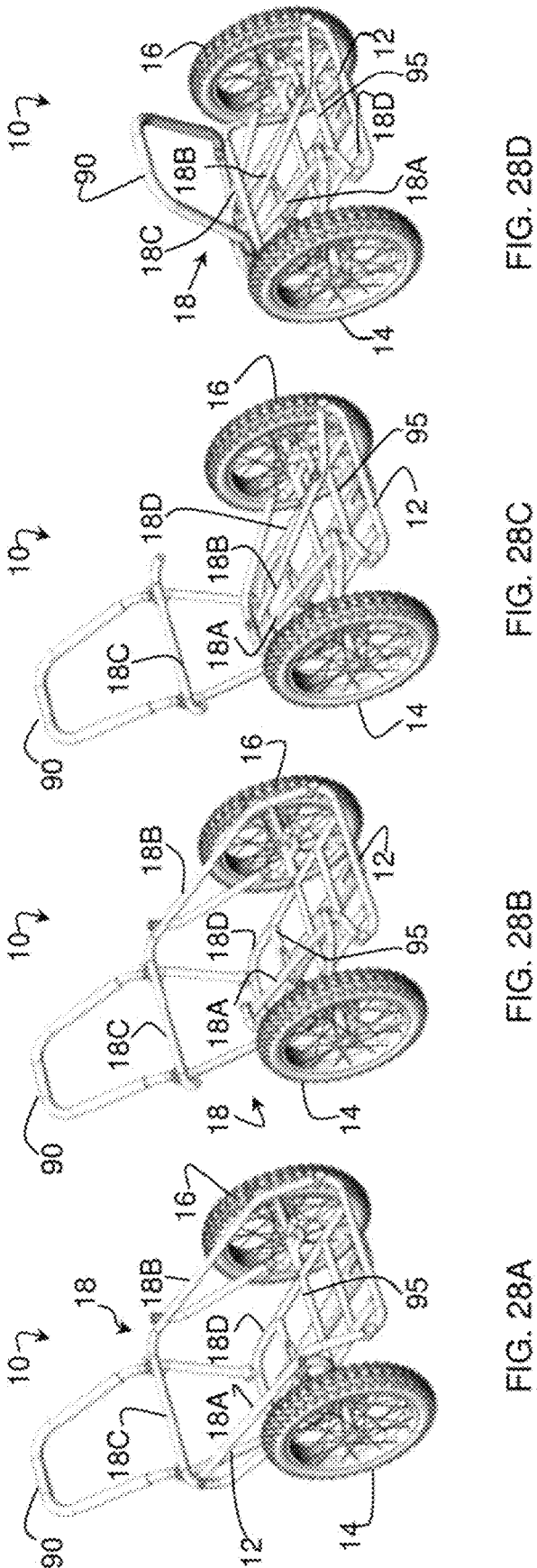
FIGS. 28A through 28D are perspective views of an embodiment of the convertible, all-terrain gear cart with a collapsible cargo cage during progressive stages of collapsing.

Under such embodiments, the gear cart 10 can be disposed in the fully open use configuration of FIG. 28A where the left, right, anterior, and bottom frame sections 18A, 18B, 18C, and 18D cooperate to define an inner cargo volume. Based on the independent pivoting of the sections 18A, 18B, 18C, and 18D, the gear cart 10 can be alternatively disposed in what essentially amounts to a flat bed configuration as in FIG. 28C by selectively pivoting the left and right cargo frame sections 18A and 18B to collapsed positions resting atop the bottom frame section 18D while leaving the anterior frame section 18C is an extended, use configuration. With that, gear can still be transported atop the cart 10 using the left, right, and bottom frame sections 18A, 18B, and 18D as a flat bed support structure. The gear cart 10 can thus be converted to a flat bed mode while maintaining support and hauling functionality. Moreover, when desired, the gear cart 10 can be placed in a full storage condition by additionally pivoting the anterior frame section 18C to the collapsed configuration of FIG. 28D and, potentially, by removing the left and right wheels 14 and 16.

Figure 31:
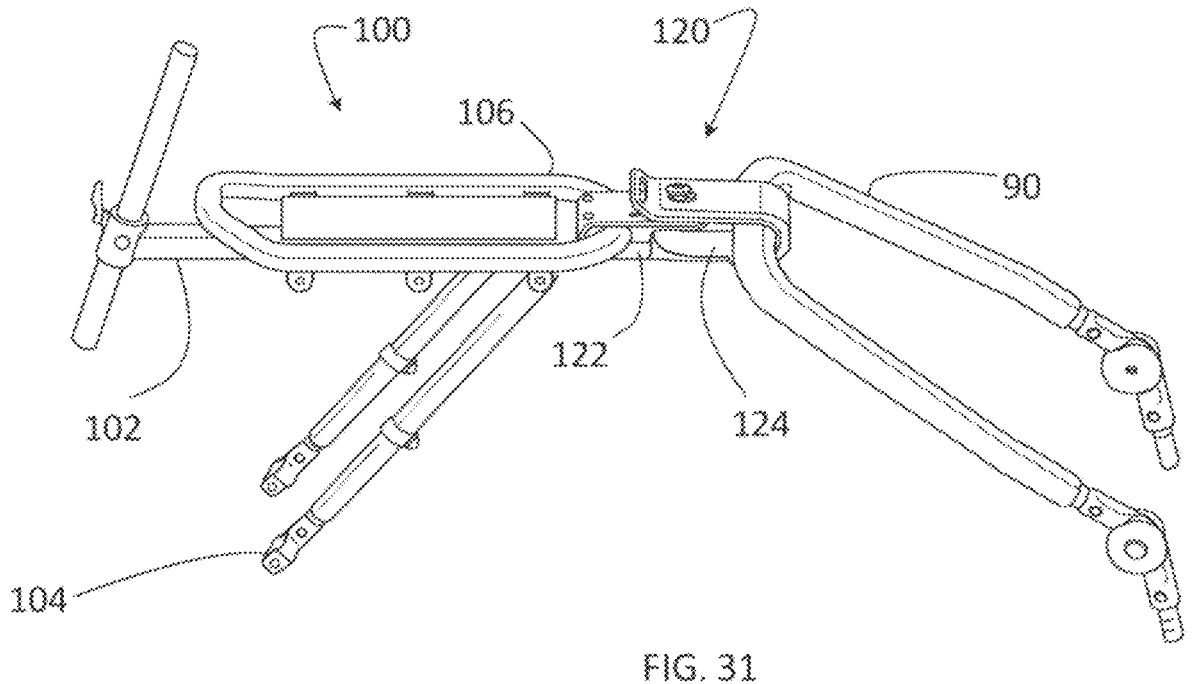
FIG. 31 is a perspective view of another towing adapter as disclosed herein shown establishing a towing relationship between a tow and control handle of a gear cart and a towing vehicle.

An alternative towing system for establishing a towing relationship between a towing vehicle and a gear cart with a tow and control handle 90 as disclosed herein is depicted in FIG. 31. In this embodiment, the towing relationship is established by a towing connection established by a clamping tow adapter 120. The tow and control handle 90 again is designed to have a proximal portion connected to the remainder of the gear cart as previously shown and described. The tow and control handle 90 again has the general shape of a bow of a yoke such that the tow and control handle 90 has first and second legs with a lateral engaging section therebetween. The ends of the first and second legs are removably fixed in relation to remainder of the gear cart with the lateral engaging section spanning therebetween. The lateral engaging section is configured to be disposed centered upon and orthogonal to the longitudinal centerline of the gear cart.

The clamping tow adapter 120 is formed with a clamping connector 122 for clamping in relation to a towing vehicle and a resilient connector 124 for receiving and retaining the lateral engaging section of the tow and control handle 90 of the gear cart. The towing vehicle could comprise any type of vehicle, such as but not limited to a manual or electric bicycle, a motorcycle, an all-terrain vehicle, or any other type of vehicle that has a member onto which the clamping connector 122 of the clamping towing adapter 120 can clamp. In the present, non-limiting example, the clamping connector 122 is clamped onto a rack 100 adapted for being retained by a towing vehicle. The rack 100 may be one previously existing on a bicycle, all-terrain vehicle, or other vehicle, or the rack 100 could be specially installed for use according to the present invention. The rack 100 in the depicted example has a main frame 102, first and second support arms 104, and a support frame 106.

Figure 32:
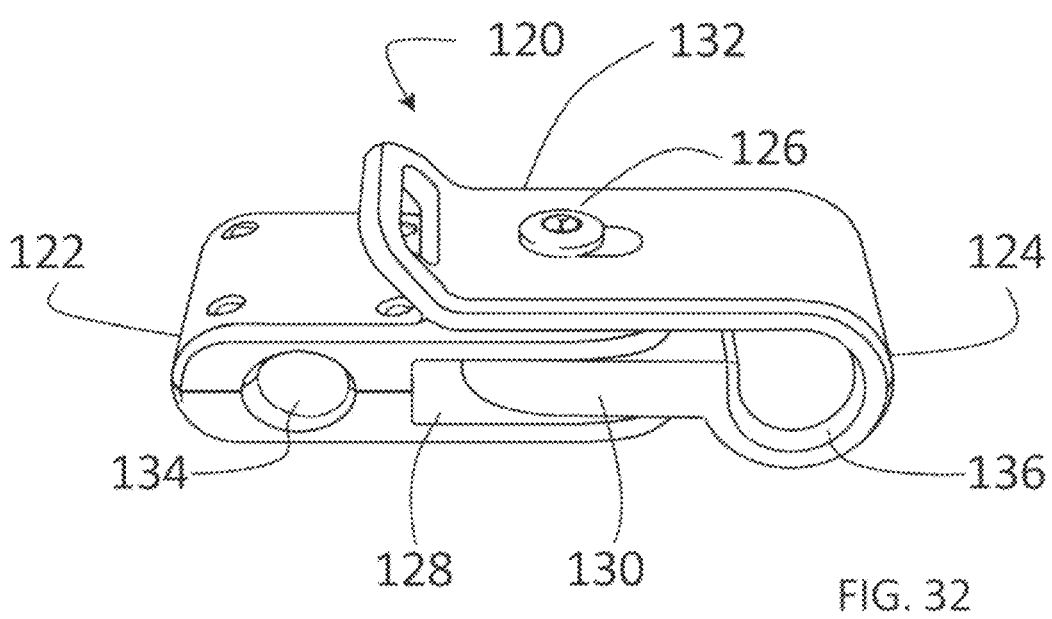
FIG. 32 is a perspective view of the towing adapter of FIG. 31.
Figure 33:
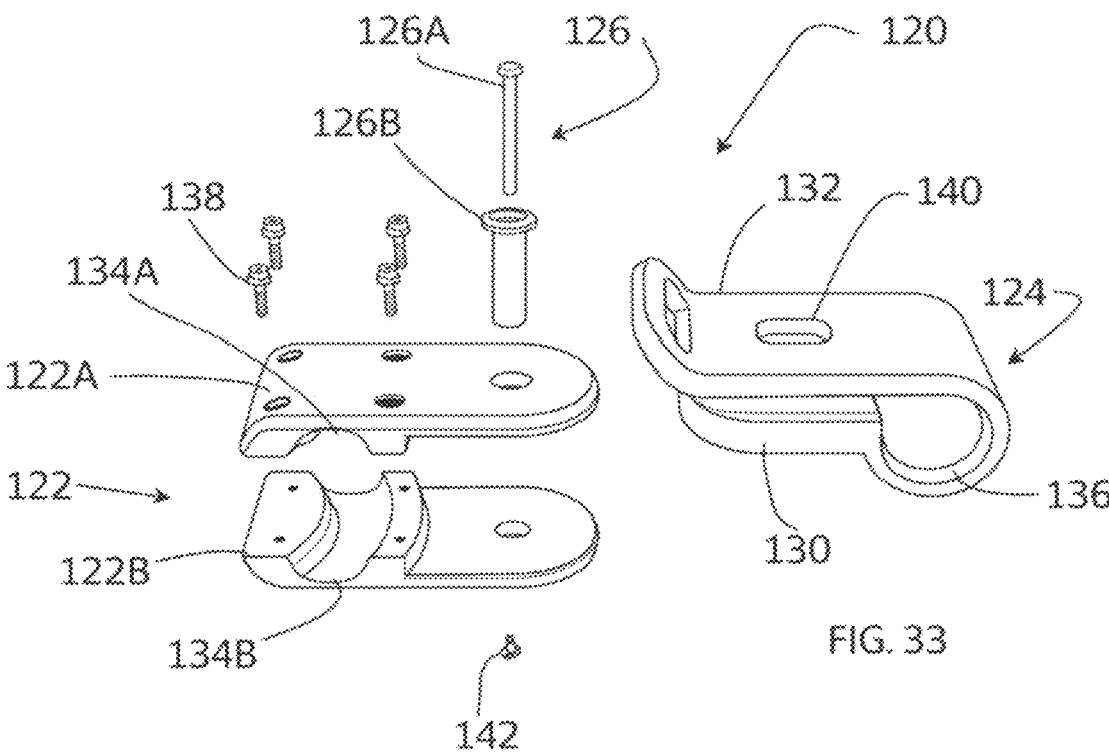
FIG. 33 is an exploded perspective view of the towing adapter of FIG. 31.

The clamping tow adapter 120 can be further understood with reference to FIGS. 32 and 33. There, one can perceive that a pivoting relationship is established between the clamping connector 122 and the resilient connector 124 and thus between the towing vehicle and the gear cart by a pivot post 126. In the depicted example, the clamping connector 122 is formed from a rigid material, such as a metal, a hard plastic, or any other suitable material or combination thereof, while the resilient connector 124 is formed from a resiliently deformable material, such as a rubber or any other suitable material. In this embodiment, the pivot post 126 is disposed generally vertically such that a generally vertical pivot axis is established between the clamping connector 122 and the resilient connector 124 and such that a lateral relative pivoting is enabled between the towing vehicle and the gear cart. Moreover, by virtue of the flexible resiliency of the resilient connector 124, added universal relative flexion is permitted to facilitate a stable yet universally flexible interconnection between the towing vehicle and the gear cart.

With further reference to FIGS. 32 and 33, the clamping connector 122 can be seen to be formed with upper and lower clamping members 122A and 122B. The upper clamping member 122A has a clamping portion with a clamping channel 134A, and the lower clamping member 122B has a clamping portion with a clamping channel 134B. Moreover, each clamping member 122A and 122B has a tongue portion. When the upper clamping member 122A is fastened to the lower clamping member 122B, such as by mechanical fasteners 138, a generally tubular clamping formation 134 is formed for receiving and engaging a portion of the towing vehicle or a structure affixed to the towing vehicle. As used herein, generally tubular shall not require a complete tubular shape, particularly since it is recognized that the clamping channels 134A and 134B may be secured in spaced relation to one another, such as where a frame portion of the rack 100 or another structure is broader in effective diameter than the clamping formation 134. For instance, the clamping connector 122 can be clamped upon a frame portion of the rack 100, which is in turn fixed to the towing vehicle, as shown in FIG. 31 or to any other structural portion of the towing vehicle.

Moreover, the upper and lower clamping members 122A and 122B of the clamping connector 122 have upper and lower tongues that project in parallel to establish a receiving bay 128. The resilient connector 124 has a tongue portion 130 that is received into the receiving bay 128 between the tongues of the clamping members 122A and 122B, an arcuate tubular portion 136 that causes the resilient connector 124 to reverse back toward the tongue portion 130, and a flap portion 132 that is positioned to overlie the tongue portion 130.

The pivot post 126, which is here formed by a core rod 126A and an outer sleeve 126B, passes through the tongue of the upper clamping member 122A, through the tongue portion 130 of the resilient connector 124, and into the tongue of the lower clamping member 122B. A setscrew 142 is received through the tongue of the lower clamping member 122B and into the distal end of the core rod 126A of the pivot post 126 to secure the pivot post 126 in place. When the pivot post 126 is fully received into the clamping connector 122 as in FIGS. 31 and 32, a proximal portion of the pivot post 126, here formed by the proximal portions of the core rod 126A and the outer sleeve 126B, projects beyond the tongue of the upper clamping member 122A. The outer sleeve 126B of the pivot post 126 has a broadened proximal head portion, and the flap portion 132 of the resilient connector 124 has a fastening aperture 140 therethrough sized to receive the proximal head portion of the pivot post 126 therethrough in an interference fit.

With this, as best illustrated in FIG. 31, a towing relationship between a gear cart as disclosed herein and a towing vehicle can be established by use of the clamping tow adapter 120. In any order of steps, one can secure the clamping connector 122 to the towing vehicle, and one can secure the tow and control handle 90 of the gear cart within the resilient connector 122. For instance, the clamping connector 122 can be clamped onto a frame member of a vehicle rack 100 or to another portion of the towing vehicle by causing the frame member or other portion of the towing vehicle to be received between the upper and lower clamping members 122A and 122B and then drawing the clamping members 122A and 122B together, such as by operation of the mechanical fasteners 138 shown in FIG. 33. Further, the tow and control handle 90 of the gear cart can be secured relative to the clamping tow adapter 120 by causing the flap portion 132 to be disengaged from the head portion of the pivot post 126, disposing the lateral engaging section of the tow and control handle 90 within the tubular portion 136 of the resilient connector 124, and then causing the head portion of the pivot post 126 to be received through the fastening aperture 140 within the flap portion 132.

Advantageously, with the towing relationship so established, the resilient connector 124 permits a flexible yet secure interconnection between the towing vehicle and the gear cart based on the resilient flexibility of the resilient connector 124. Moreover, the pivot post 126 not only ensures a secure retention of the tow and control handle 90 but it also acts as a pivot axis between the resilient connector 124 and the clamping connector 122 and thus between the gear cart and the towing vehicle. With that, a universally flexible yet secure interconnection is formed to permit, among other things, vertical pivoting, lateral pivoting, and relative torsion between the towing vehicle and the gear cart thereby facilitating stable towing even over rough and uneven terrain.

It will be understood that any terms of orientation used herein merely provide a complete understanding of the disclosed convertible, all-terrain gear cart 10 and are not limiting of the invention. Other nomenclature and conventions may be used without limitation of the teachings herein. Furthermore, the various components disclosed herein are merely illustrative and are not limiting. For example, except as limited by the claims, each of the components discussed herein may include subcomponents that collectively provide for the structure and function of the disclosed component. Furthermore, one or more components, sometimes referred to as members or otherwise herein, could be combined as a unitary structure while still corresponding to the disclosed invention. Additional components that provide additional functions or enhancements to those introduced herein may be included. For example, additional components or materials, combinations of components or materials, and perhaps the omission of components or materials may be used to create embodiments that are nonetheless within the scope of the invention.

When referencing or introducing elements of the present invention or embodiments thereof, the articles "a," "an," and "the" are intended to mean that there are one or more of the elements. Terms such as "comprising," "including," and "having" are intended to be inclusive such that there may be additional elements other than the listed elements. As used herein, the terms "example" and "exemplary" are not intended to imply a superlative example. Rather, such terms refer to an embodiment that is one of many possible embodiments.

With certain details and embodiments of the present invention for a convertible, all-terrain gear cart and a towing system for such a cart disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall define the scope of protection to be afforded to the inventors. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

The invention claimed is:

1. A convertible, all-terrain gear cart towing system for establishing a towing relationship between a towing vehicle and a convertible, all-terrain gear cart that has a tow and control handle with an engaging portion, the towing system comprising:

a tow adapter comprising a connector configured for engaging a portion of the towing vehicle and a resilient connector for receiving and retaining the engaging portion of the tow and control handle of the gear cart;

wherein the resilient connector has a tongue portion that is pivotally coupled to the connector by a pivot post, a receiving portion for receiving and retaining the engaging portion of the tow and control handle, and a flap portion for selectively securing the engaging portion of the tow and control handle within the receiving portion, wherein the pivot post has a head portion, and wherein the flap portion of the resilient connector has an aperture for selectively receiving the head portion of the pivot post for selectively fixing the flap portion to the pivot post;

whereby the convertible, all-terrain gear cart can be selectively attached to the towing vehicle for towing by causing the engaging portion of the tow and control handle to be received and retained by the resilient connector of the tow adapter and by causing the connector to engage the portion of the towing vehicle and whereby the convertible, all-terrain gear cart can be selectively detached from the towing vehicle by causing the engaging portion of the tow and control handle to be removed from the resilient connector of the tow adapter.

2. The towing system of claim 1, wherein the resilient connector comprises a resiliently flexible material and wherein the connector comprises a rigid material.

3. The towing system of claim 1, wherein the connector has a receiving bay and wherein the tongue portion of the resilient connector is received into the receiving bay of the connector and pivotally coupled to the connector by the pivot post within the receiving bay.

4. The towing system of claim 1, wherein the connector comprises a clamping connector for clamping in relation to the portion of the towing vehicle and wherein the clamping connector comprises upper and lower clamping members.

5. The towing system of claim 4, wherein the upper and lower clamping members cooperate to form a clamping channel for clamping in relation to the portion of the towing vehicle.

6. The towing system of claim 1, wherein the pivot post is disposed vertically whereby a vertical pivot axis is established between the resilient connector and the connector and whereby a lateral pivoting is enabled between the towing vehicle and the gear cart.

7. The towing system of claim 6, wherein the resilient connector comprises a resiliently flexible material whereby universal relative flexion is permitted between the towing vehicle and the gear cart.

8. A convertible, all-terrain gear cart towing system for establishing a towing relationship between a towing vehicle and a convertible, all-terrain gear cart that has a tow and control handle with an engaging portion, the towing system comprising:

a tow adapter comprising a connector configured for engaging a portion of the towing vehicle and a resilient connector for receiving and retaining the engaging portion of the tow and control handle of the gear cart;

wherein the connector comprises a clamping connector for clamping in relation to the portion of the towing vehicle, wherein the clamping connector comprises upper and lower clamping members, wherein the upper and lower clamping members cooperate to form a clamping channel for clamping in relation to the portion of the towing vehicle, wherein the clamping connector has a receiving bay, and wherein the resilient connector has a tongue portion that is received into the receiving bay;

whereby the convertible, all-terrain gear cart can be selectively attached to the towing vehicle for towing by causing the engaging portion of the tow and control handle to be received and retained by the resilient connector of the tow adapter and by causing the connector to engage the portion of the towing vehicle and whereby the convertible, all-terrain gear cart can be selectively detached from the towing vehicle by causing the engaging portion of the tow and control handle to be removed from the resilient connector of the tow adapter.

9. The towing system of claim 8, wherein the clamping connector has a pivot post and wherein the tongue portion of the resilient connector is pivotally retained by the pivot post.

10. The towing system of claim 9, wherein the resilient connector further comprises a receiving portion for receiving and retaining the engaging portion of the tow and control handle and a flap portion for selectively securing the engaging portion of the tow and control handle within the receiving portion.

11. The towing system of claim 10, wherein the pivot post has a head portion and wherein the flap portion of the resilient connector has an aperture for selectively receiving the head portion of the pivot post for selectively fixing the flap portion to the pivot post.

12. The towing system of claim 9, wherein the pivot post is disposed vertically whereby a vertical pivot axis is established between the resilient connector and the clamping connector and whereby a lateral pivoting is enabled between the towing vehicle and the gear cart.

* * * * *